United States Patent
Park et al.

(10) Patent No.: US 10,459,292 B2
(45) Date of Patent: Oct. 29, 2019

(54) LIQUID CRYSTAL DISPLAY AND LIQUID CRYSTAL COMPOSITION COMPRISED THEREOF

(71) Applicant: SAMSUNG DISPLAY CO., LTD., Yongin-si, Gyeonggi-do (KR)

(72) Inventors: Joon Hyung Park, Yongin-si (KR); Kyung Hae Park, Yongin-si (KR); Jong Ho Son, Yongin-si (KR); Jin Hyeong Lee, Yongin-si (KR); Hye Lim Jang, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 77 days.

(21) Appl. No.: 15/494,038

(22) Filed: Apr. 21, 2017

(65) Prior Publication Data
US 2018/0046033 A1    Feb. 15, 2018

(30) Foreign Application Priority Data

Aug. 11, 2016 (KR) .................. 10-2016-0102290

(51) Int. Cl.
*G02F 1/1337* (2006.01)
*C09K 19/32* (2006.01)
(Continued)

(52) U.S. Cl.
CPC ...... *G02F 1/133711* (2013.01); *C09K 19/065* (2013.01); *C09K 19/3001* (2013.01);
(Continued)

(58) Field of Classification Search
None
See application file for complete search history.

(56) References Cited

U.S. PATENT DOCUMENTS 5,744,060 A * 4/1998 Tarumi ................ C09K 19/30
252/299.63
5,993,691 A * 11/1999 Pausch ............... C09K 19/0403
252/299.61
(Continued)

FOREIGN PATENT DOCUMENTS

DE      19528665        2/1997
DE      19909760 B4 *   5/2015   ........... C07D 307/79
(Continued)

OTHER PUBLICATIONS

English translation of DE19909760. (Year: 2015).*
(Continued)

*Primary Examiner* — Cynthia H Kelly
*Assistant Examiner* — Anna Malloy
(74) *Attorney, Agent, or Firm* — F. Chau & Associates, LLC

(57) ABSTRACT

A liquid crystal display includes a first substrate, a second substrate opposing the first substrate, an electrode portion provided on at least one of the first and second substrates, and a liquid crystal layer provided between the first substrate and the second substrate and including a liquid crystal composition. The liquid crystal composition includes a liquid crystal compound including a cyclohexenylene group, and provides the liquid crystal display with low rotary viscosity and high voltage holding ratio.

28 Claims, 9 Drawing Sheets

(51) Int. Cl.
*C09K 19/30* (2006.01)
*C09K 19/56* (2006.01)
*G02F 1/1335* (2006.01)
*G02F 1/1339* (2006.01)
*C09K 19/06* (2006.01)
*G02F 1/00* (2006.01)

(52) U.S. Cl.
CPC .......... *C09K 19/3098* (2013.01); *C09K 19/32* (2013.01); *C09K 19/56* (2013.01); *G02F 1/00* (2013.01); *G02F 1/13394* (2013.01); *G02F 1/133514* (2013.01); *C09K 2019/3004* (2013.01); *C09K 2019/3009* (2013.01); *C09K 2019/3027* (2013.01); *G02F 2001/13398* (2013.01); *G02F 2202/023* (2013.01)

(56) References Cited

U.S. PATENT DOCUMENTS

| | | | |
|---|---|---|---|
| 6,689,291 B1* | 2/2004 | Reiffenrath | C07C 25/18 |
| | | | 252/299.63 |
| 6,793,983 B1 | 9/2004 | Heckmeier et al. | |
| 8,168,081 B2 | 5/2012 | Klasen-Memmer et al. | |
| 8,313,669 B2 | 11/2012 | Bernatz et al. | |
| 8,585,925 B2 | 11/2013 | Czanta et al. | |
| 2002/0084443 A1* | 7/2002 | Heckmeier | C09K 19/30 |
| | | | 252/299.63 |
| 2002/0106568 A1* | 8/2002 | Asano | C08F 8/16 |
| | | | 430/18 |
| 2006/0163536 A1* | 7/2006 | Matsumoto | C09K 19/3402 |
| | | | 252/299.61 |
| 2008/0149891 A1* | 6/2008 | Klasen-Memmer | C09K 19/16 |
| | | | 252/299.63 |
| 2012/0261614 A1* | 10/2012 | Goto | C07C 22/00 |
| | | | 252/299.61 |
| 2012/0282838 A1* | 11/2012 | Kim | G02F 1/133753 |
| | | | 445/25 |
| 2013/0101755 A1* | 4/2013 | Lee | G02F 1/133707 |
| | | | 428/1.23 |
| 2013/0183460 A1 | 7/2013 | Klasen-Memmer et al. | |
| 2015/0198847 A1* | 7/2015 | Park | G02F 1/133723 |
| | | | 349/123 |
| 2015/0267118 A1 | 9/2015 | Park et al. | |
| 2016/0075946 A1* | 3/2016 | Ogawa | C09K 19/44 |
| | | | 252/299.63 |
| 2016/0122650 A1 | 5/2016 | Hirata et al. | |

FOREIGN PATENT DOCUMENTS

| | | | | |
|---|---|---|---|---|
| EP | 2607451 | | 12/2012 | |
| JP | 2003238459 A | * | 8/2003 | |
| KR | 20040078713 A | * | 9/2004 | ......... C09K 19/0403 |
| KR | 10-2012-0003857 | | 1/2012 | |
| KR | 10-2016-0024772 | | 3/2016 | |
| KR | 10-2016-0052783 | | 5/2016 | |
| KR | 10-1649086 | | 8/2016 | |
| WO | WO-9606073 A1 | * | 2/1996 | ............ C07C 17/00 |
| WO | 9623851 | | 8/1996 | |
| WO | 0037586 | | 6/2000 | |

OTHER PUBLICATIONS

English translation of JP2003238459. (Year: 2003).*
European Search Report dated Dec. 6, 2017 in corresponding European Application Serial No. 17176294.1 (12 pages).
European Office Action dated Apr. 12, 2019 in corresponding European Application Serial No. 17176294.1 (8 pages).

* cited by examiner

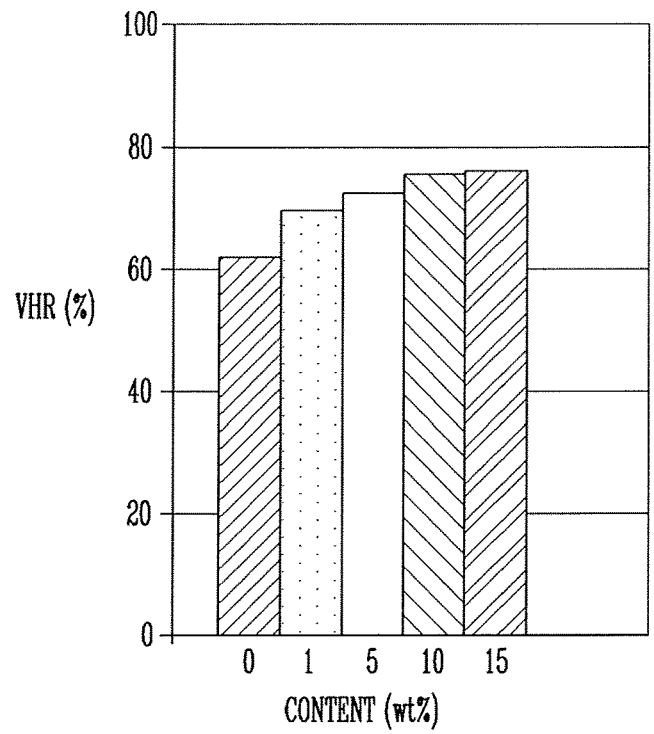
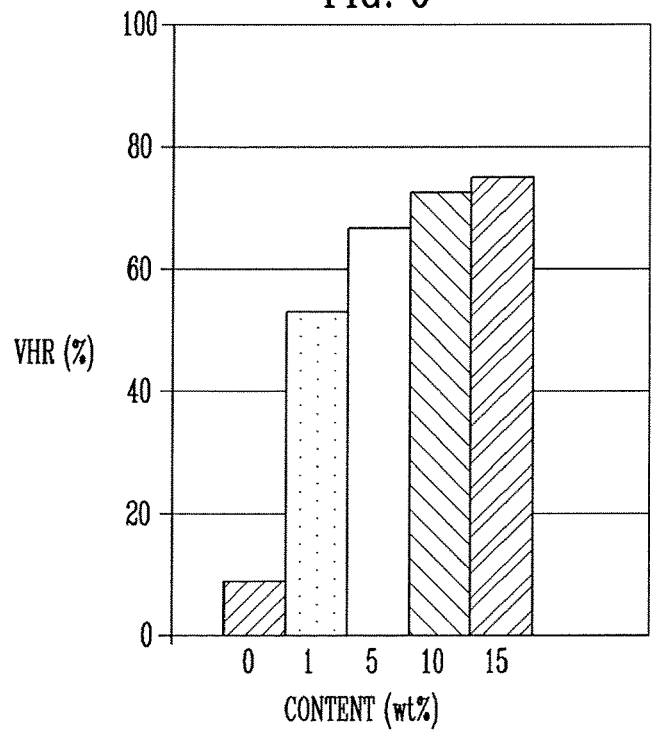

LIQUID CRYSTAL DISPLAY AND LIQUID CRYSTAL COMPOSITION COMPRISED THEREOF

CROSS-REFERENCE TO RELATED APPLICATION

This application claims priority under 35 U.S.C. § 119 to Korean Patent Application No. 10-2016-0102290, filed on Aug. 11, 2016 in the Korean Intellectual Property Office, the disclosure of which is incorporated by reference herein in its entirety.

TECHNICAL FIELD

The present invention relates to a liquid crystal display and a liquid crystal composition comprised thereof.

DISCUSSION OF RELATED ART

In general, a liquid crystal display may include a first substrate including a plurality of pixel electrodes, a second substrate having a common electrode, and a liquid crystal layer provided between the first and second substrates. The liquid crystal display may display an image by changing optical transmittance of the liquid crystal layer according to an electrical field formed between each of the plurality of pixel electrodes and the common electrode. The liquid crystal display may include a plurality of pixels each of which includes the pixel electrode.

Recently, liquid crystal displays have been developed to display three-dimensional images as well as two-dimensional images. In other words, the newly developed liquid crystal displays may be required to have the capability of providing more image information. Therefore, there is an increasing demand for the newly developed liquid crystal displays to have higher driving speed and better reliability than those of the conventional liquid crystal displays. As a result, the liquid crystal composition included in the liquid crystal layer may be required to have properties such as, for example, appropriate dielectric anisotropy, appropriate refractive index anisotropy, low rotary viscosity, high voltage holding ratio, etc.

SUMMARY

The present invention is to provide a liquid crystal display having a low rotary viscosity and a high voltage holding ratio and a liquid crystal composition comprised thereof.

According to an exemplary embodiment of the present invention, a liquid crystal display includes a first substrate, a second substrate opposing the first substrate, an electrode portion provided on at least one of the first and second substrates, and a liquid crystal layer provided between the first substrate and the second substrate and including a liquid crystal composition, wherein the liquid crystal composition comprises at least one of liquid crystal compounds represented by the following Chemical Formula 1:

[Chemical Formula 1]

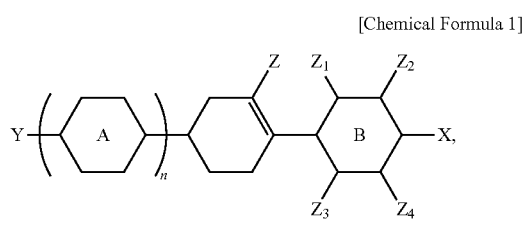

where Y may be H or alkyl having 1 to 5 C atoms, the alkyl having 1 to 5 C atoms may include being not substituted or wherein one or more —$CH_2$— groups each, independently of one another, may be substituted by —C≡C—, —$CF_2O$—, —O—, —CO—O—, —O—CO— or —O—CO—O so that O atoms are not directly linked to each other, 1 to 3 H atoms may be substituted by halogen, or combination thereof, A may be 1,4-cyclohexylene or 1,4-phenylene, $Z_1$ to $Z_4$ each, independently of one another, may be H, F, Cl, or alkyl having 1 to 2 C atoms, B may be 1,4-cyclohexylene or 1,4-phenylene, wherein B is 1,4-phenylene when at least one of $Z_1$ to $Z_4$ is F or Cl, n may be 0 or 1, Z may be H, F, Cl, or alkyl having 1 to 2 C atoms, wherein Z is H when Y is H, and X may be F, Cl, or alkyl having 1 to 4 C atoms, the alkyl having 1 to 4 C atoms may include being not substituted or wherein one or more —$CH_2$— groups each, independently of one another, may be substituted by —C≡C—, —$CF_2O$—, —O—, —CO—O—, —O—CO— or —O—CO—O— so that O atoms are not directly linked to each other, 1 to 3 H atoms may be substituted by halogen, or combination thereof.

The liquid crystal compound of Chemical Formula 1 may be present in an amount exceeding 0 wt % but less than 15 wt % based on a total weight of the liquid crystal composition.

The liquid crystal compound of Chemical Formula 1 may include at least one of liquid crystal compounds represented by the following Chemical Formula 1-1:

[Chemical Formula 1-1]

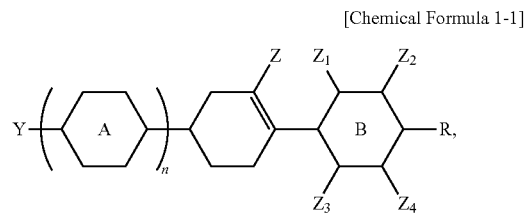

where Y, A, $Z_1$ to $Z_4$, B, n, and Z may be as defined in Chemical Formula 1, and R may be alkyl or alkoxy having 1 to 4 C atoms.

The liquid crystal compound of Chemical Formula 1-1 may include at least one of liquid crystal compounds represented by the following Chemical Formulae 1-1-1 to 1-1-5:

[Chemical Formula 1-1-1]

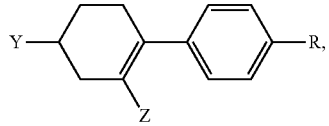

[Chemical Formula 1-1-2]

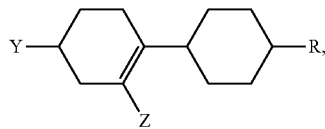

[Chemical Formula 1-1-3]

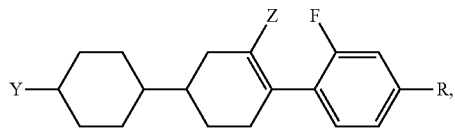

[Chemical Formula 1-1-4]

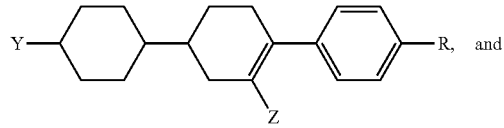

R, and

[Chemical Formula 1-1-5]

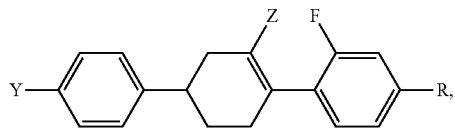

where Y, Z, and R may be as defined in Chemical Formula 1-1.

The liquid crystal compound represented by Chemical Formula 1 may include at least one of liquid crystal compounds represented by the following Chemical Formulae 1-2 and 1-3:

[Chemical Formula 1-2]

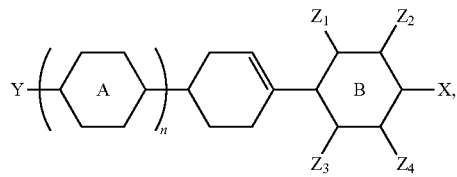

where Y is H, and A, $Z_1$ to $Z_4$, B, n, and X are as defined in Chemical Formula 1, and

[Chemical Formula 1-3]

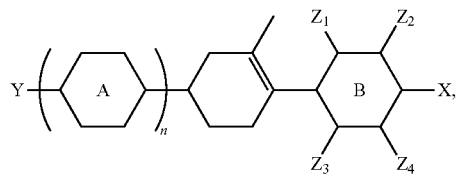

where Y, A, $Z_1$ to $Z_4$, B, n, and X are as defined in Chemical Formula 1.

The liquid crystal compound of Chemical Formula 1-2 may include at least one of liquid crystal compounds represented by the following Chemical Formulae 1-2-1 to 1-2-3:

[Chemical Formula 1-2-1]

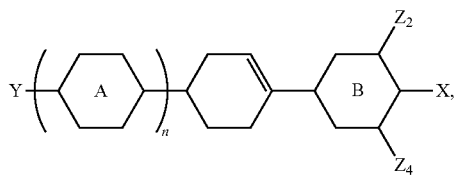

[Chemical Formula 1-2-2]

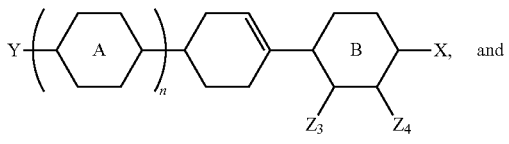

and

[Chemical Formula 1-2-3]

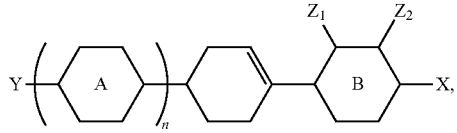

where Y is H, and A, $Z_1$ to $Z_4$, B, n, and X may be as defined in Chemical Formula 1.

The liquid crystal compound of Chemical Formula 1-2 may include at least one of liquid crystal compounds represented by the following Chemical Formulae 1-2-4 and 1-2-5:

[Chemical Formula 1-2-4]

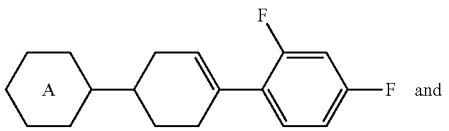

and

[Chemical Formula 1-2-5]

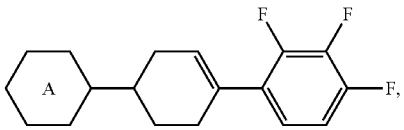

where A may be as defined in Chemical Formula 1.

The liquid crystal compound of Chemical Formula 1-3 may include at least one of liquid crystal compounds represented by Chemical Formulae 1-3-1 to 1-3-3:

[Chemical Formula 1-3-1]

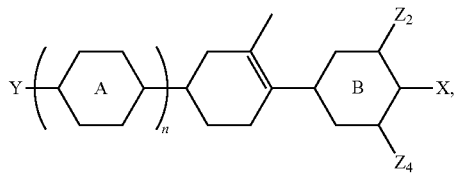

-continued

[Chemical Formula 1-3-2]

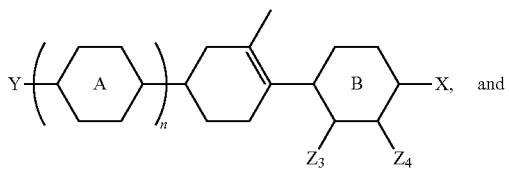

[Chemical Formula 1-3-3]

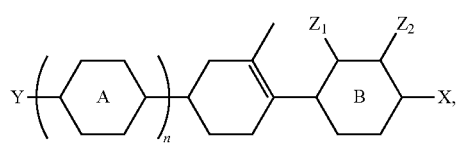

where Y, A, $Z_1$ to $Z_4$, B, n, and X may be as defined in Chemical Formula 1.

the liquid crystal compound of Chemical Formula 1-3 may include at least one of liquid crystal compounds represented by the following Chemical Formulae 1-3-4 and 1-3-5:

[Chemical Formula 1-3-4]

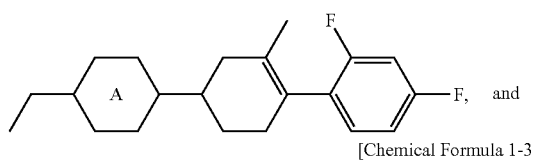

[Chemical Formula 1-3-5]

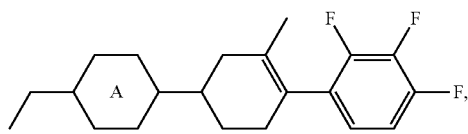

where A is as defined in Chemical Formula 1.

The liquid crystal composition may include at least one of liquid crystal compounds represented by the following Chemical Formula 2 and Chemical Formula 3:

[Chemical Formula 2]

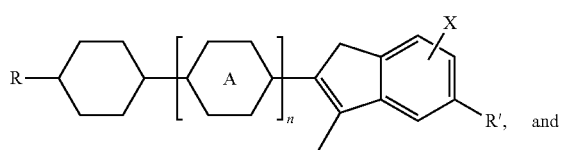

[Chemical Formula 3]

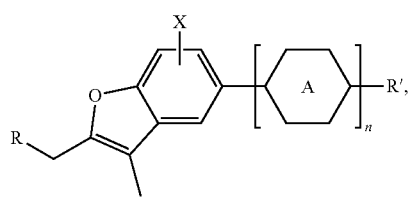

where A, n, and X of Chemical Formula 2 and Chemical Formula 3 each, independently of one another, may be as defined in Chemical Formula 1, and R and R' each, independently of one another, may be alkyl or alkoxy having 1 to 4 C atoms.

Any combination of the liquid crystal compound of Chemical Formula 1 and at least one of the liquid crystal compound of Chemical Formula 2 and the liquid crystal compound of Chemical Formula 3 may be present in an amount exceeding 0 wt % but less than 15 wt % based on a total weight of the liquid crystal composition.

The liquid crystal display may further include an alignment layer provided between the first substrate and the liquid crystal layer and between the second substrate and the liquid crystal layer, wherein the alignment layer includes a polymer obtained by polymerizing a monomer represented by the following Chemical Formula 4:

[Chemical Formula 4]

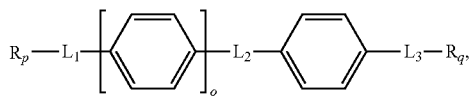

where Rp and Rq each, independently of one another, may be acrylate having 1 to 12 C atoms, methacrylate, an epoxy group, an oxetane group, a vinyl-ether group, or a styrene group, $L_1$ to $L_3$ each, independently of one another, may be a single bond, an alkyl group having 1 to 10 C atoms, ether, carbonyl, or carboxyl, and may be 1 or 2.

A polymer obtained by polymerizing a monomer represented by Chemical Formula 4 may include an oxime or acetophenone photoinitiator.

The liquid crystal display may further include a spacer between the first substrate and the second substrate, a color filter provided on one of the first and second substrates and displaying color, and a black matrix provided on one of the first and second substrates and blocking transmitted light.

The spacer, the color filter and/or the black matrix may be an organic polymer material including an oxime or acetophenone photoinitiator.

The liquid crystal composition may include at least one of liquid crystal compounds represented by the following Chemical Formula 5:

[Chemical Formula 5]

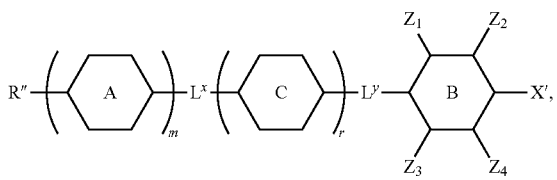

where R" may be hydrogen or alkyl having 1 to 15 C atoms, the alkyl having 1 to 15 C atoms may include being not substituted or wherein one or more —$CH_2$— groups each, independently of one another, may be substituted by —C≡C—, —$CF_2O$—, —CH═CH—, —O—, —CO—O—, —O—CO— or —O—CO—O— so that O atoms are not directly linked to each other, 1 to 3 H atoms may be substituted by halogen, and combination thereof, A, B, and C each, independently of one another, may be 1,4-cyclohexylene or 1,4-phenylene, m and r each, independently of one another, may be 0 to 2, $L^x$ and $L^y$ each, independently of one another, may be a single bond, —C≡C—, —COO—, —OCO—, —CF$_2$O—, —OCF$_2$—, —CH$_2$O—, —CO—, —O—, —(CH$_2$)$_2$—, or —CH=CH—, $Z_1$ to $Z_4$ each, independently of one another, may be H, F, Cl, —OCF$_3$, —CF$_3$, —CHF$_2$, or —CH$_2$F, and X' may be hydrogen, F, Cl, or alkyl having 1 to 15 C atoms, the alkyl having 1 to 15 C atoms may include being not substituted or wherein one or more —CH$_2$— groups each, independently of one another, may be substituted by —C≡C—, —CF$_2$O—, —CH=CH—, —CO—, —O—, —CO—O—, —O—CO— or —O—CO—O— so that O atoms are not directly linked to each other, 1 to 3 H atoms may be substituted by halogen, or combination thereof.

The liquid crystal composition may have negative dielectric anisotropy.

According to an exemplary embodiment of the present invention, a liquid crystal composition includes at least one of liquid crystal compounds represented by the following Chemical Formula 1:

[Chemical Formula 1]

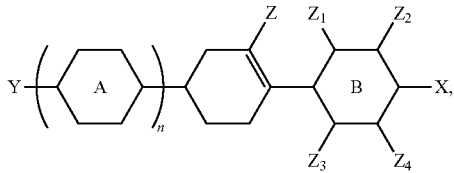

where Y may be H or a hydrocarbon group having 1 to 10 C atoms, the hydrocarbon group having 1 to 10 C atoms may optionally include one or more hetero atoms including O and F, A may be 1,4-cyclohexylene or 1,4-phenylene, $Z_1$ to $Z_4$ each, independently of one another, may be H, F, Cl, or alkyl having 1 to 2 C atoms, B may be 1,4-cyclohexylene or 1,4-phenylene, wherein B is 1,4-phenylene when at least one of $Z_1$ to $Z_4$ is F or Cl, n may be 0 or 1, Z may be H, F, Cl, or alkyl having 1 to 2 C atoms, wherein Z may be H when Y is H, and X may be F, Cl, or a hydrocarbon group having 1 to 8 C atoms, the hydrocarbon group having 1 to 8 C atoms may optionally include one or more hetero atoms including O, F and Cl.

BRIEF DESCRIPTION OF THE DRAWINGS

These and other features of the present invention will become more apparent by describing in detail exemplary embodiments thereof with reference to the accompanying drawings in which:

FIGS. 5 to 8 are graphs illustrating voltage holding ratios when seventh to tenth liquid crystal compositions are comprised in a liquid crystal display, respectively.

Figure 1:
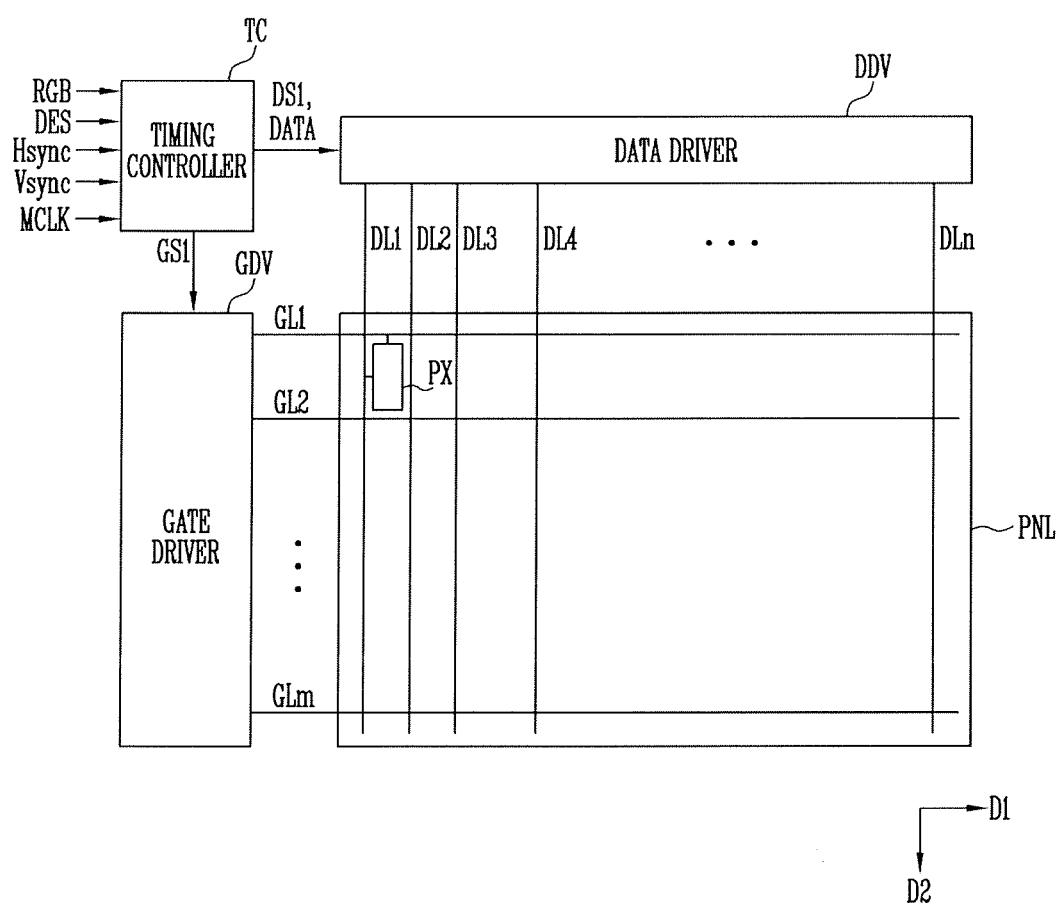
FIG. 1 is a schematic block diagram showing a liquid crystal display according to an exemplary embodiment of the present invention.

Since the drawings in FIGS. 1-10 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

Exemplary embodiments of the present invention will be described below in detail with reference to the accompanying drawings. However, the present invention may be embodied in different forms and should not be construed as limited to the specific embodiments set forth herein.

The present invention will now be described more fully with reference to the accompanying drawings, in which exemplary embodiments of the present invention are shown.

The present invention relates to a liquid crystal composition used in a liquid crystal display and more particularly, to a liquid crystal composition having negative dielectric anisotropy.

A liquid crystal composition according to an exemplary embodiment of the present invention may include at least one of liquid crystal compounds represented by Chemical Formula 1 below:

[Chemical Formula 1]

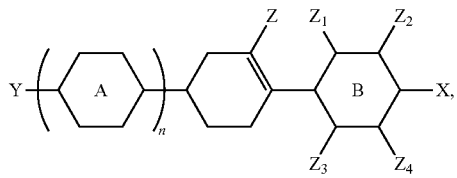

where Y may be H or alkyl having 1 to 5 C atoms, in which one or more —CH$_2$-groups may each, independently of one another, be substituted by —C≡C—, —CF$_2$O—, —O—, —CO—O—, —O—CO— or —O—CO—O— so that O atoms may not be directly linked to each other, and 1 to 3 H atoms may be substituted by halogen, A may be 1,4-cyclohexylene or 1,4-phenylene, $Z_1$ to $Z_4$ may each, independently of one another, be H, F, Cl, or alkyl having 1 to 2 C atoms, B may be 1,4-cyclohexylene or 1,4-phenylene, in which B is 1,4-phenylene when at least one of $Z_1$ to $Z_4$ is F or Cl, n may be 0 or 1, Z may be H, F, Cl, or alkyl having 1 to 2 C atoms, in which Z is H when Y is H, and X may be F, Cl, or alkyl having 1 to 4 C atoms, in which one or more —CH$_2$— groups may each, independently of one another, be substituted by —C≡C—, —CF$_2$O—, —O—, —CO—O—, —O—CO— or —O—CO—O— so that O atoms may not be directly linked to each other, and 1 to 3 H atoms may be substituted by halogen.

In the above Chemical Formula 1, —CH$_2$— may become —CH$_3$, when one linkage is to H. Similarly, for —C≡C—, it may represent —C≡CH when it is linked to H on one side. For 1,4-cyclohexylene and 1,4-phenylene, they may represent cyclohexyl, and phenyl, respectively, when they are linked to H on one side.

In the above Chemical Formula 1, Y may be unsubstituted alkyl having 1 to 5 C atoms, and X may be unsubstituted alkyl having 1 to 4 C atoms.

In an exemplary embodiment of the present invention, in the liquid crystal compound of Chemical Formula 1, Y may be H or a hydrocarbon group having 1 to 10 C atoms, and the hydrocarbon group having 1 to 10 C atoms may optionally include one or more hetero atoms which include O and F. X may be F, Cl, or a hydrocarbon group having 1 to 8 C atoms, and the hydrocarbon group having 1 to 8 C atoms may optionally include one or more hetero atoms which include O, F and Cl.

According to an exemplary embodiment of the present invention, the liquid crystal compound of Chemical Formula 1 may be present in an amount exceeding 0 wt % but less than approximately 15 wt % based on the total weight of the liquid crystal composition. When the liquid crystal compound of Chemical Formula 1 is not comprised in the liquid crystal composition, the effects by the liquid crystal compound of Chemical Formula 1 to be described below may not be obtained. When the liquid crystal compound of Chemical Formula 1 is present in an amount exceeding 15 wt % in the liquid crystal composition, it may be difficult to control dielectric anisotropy, refractive index anisotropy, and rotary viscosity of the entire liquid crystal composition.

The liquid crystal compound of Chemical Formula 1 may maintain a low rotary viscosity when the liquid crystal compound has a substituted or unsubstituted cyclohexenylene group. In addition, a double bond in the cyclohexenylene group, which is a cyclic structure, may have lower reactivity than another double bond in an acyclic structure due to steric hindrance. In addition, since a vinyl group in the cyclohexenylene group may be substituted by a halogen group or an alkyl group, additional steric hindrance caused by the existence of the halogen group or the alkyl group may inhibit a reaction between another functional group with high reactivity and the vinyl group in the cyclohexenylene group. For example, a reaction between the vinyl group and an oxime photoinitiator or an acetophenone photoinitiator as a polymerization initiator, especially in the photo initiation process, may be minimized. Therefore, when the liquid crystal compound is introduced in a liquid crystal display, a high voltage holding ratio may be obtained by preventing a reaction between the vinyl group and another functional group with high reactivity.

According to an exemplary embodiment of the present invention, the liquid crystal compound of Chemical Formula 1 may include at least one of liquid crystal compounds represented by Chemical Formula 1-1 below:

[Chemical Formula 1-1]

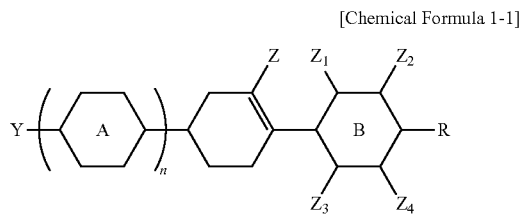

Y, A, $Z_1$ to $Z_4$, B, n, and Z may be as defined in Chemical Formula 1, and R may be alkyl or alkoxy having 1 to 4 C atoms.

In the liquid crystal compound represented by Chemical Formula 1-1, B may be 1,4-phenylene or 1,4-cyclohexylene and the substituent R may be alkyl or alkoxy except for a halogen group, such as F or Cl.

According to an exemplary embodiment of the present invention, $Z_1$ to $Z_4$ may not be necessarily all substituted, for example, one or two of $Z_1$ to $Z_4$ may be substituted with F, Cl, or alkyl having 1 to 2 C atoms.

According to an exemplary embodiment of the present invention, the liquid crystal compound of Chemical Formula 1-1 may include at least one of liquid crystal compounds represented by Chemical Formulae 1-1-1 to 1-1-5 as follows:

[Chemical Formula 1-1-1]

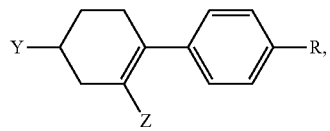

[Chemical Formula 1-1-2]

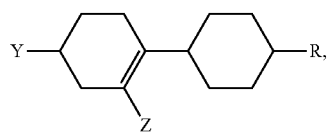

[Chemical Formula 1-1-3]

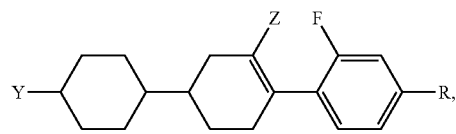

[Chemical Formula 1-1-4]

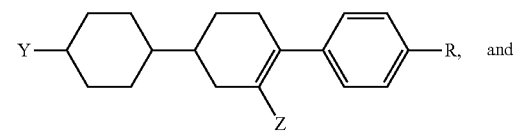

and

[Chemical Formula 1-1-5]

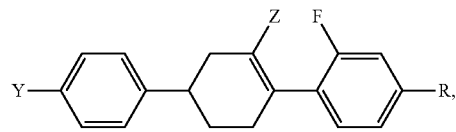

where Y, Z, and R may be defined as Chemical Formula 1-1.

Each of the liquid crystal compounds represented by Chemical Formulae 1-1-1 to 1-1-5 may have a substituted or unsubstituted cyclohexenylene group to maintain a low rotary viscosity. The low rotary viscosity may result from a double bond of the cyclohexenylene group.

According to an exemplary embodiment of the present invention, in the liquid crystal compounds represented by Chemical Formulae 1-1-1 to 1-1-5, Z may be F, Cl, or alkyl having 1 to 2 C atoms. Steric hindrance on the double bond may be caused by substituting Z of the cyclohexenylene ring with a halogen group or an alkyl group, so that the reactivity of the double bond of the cyclohexenylene may be reduced.

According to an exemplary embodiment of the present invention, the liquid crystal compound represented by Chemical Formula 1 may include at least one of liquid crystal compounds represented by Chemical Formula 1-2 and Chemical Formula 1-3 as follows:

[Chemical Formula 1-2]

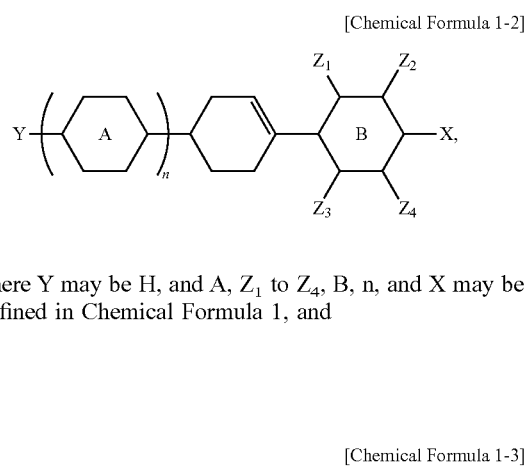

where Y may be H, and A, $Z_1$ to $Z_4$, B, n, and X may be as defined in Chemical Formula 1, and

[Chemical Formula 1-3]

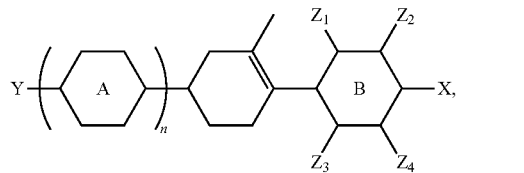

where Y, A, $Z_1$ to $Z_4$, B, n, and X may be as defined in Chemical Formula 1.

The liquid crystal compound represented by Chemical Formula 1-2 may correspond to Chemical Formula 1 where Y and Z are H. The liquid crystal compound of Chemical Formula 1-2 may have a cyclohexenylene group to maintain a low rotary viscosity. In addition, a double bond in the cyclohexenylene group may have a lower reactivity than an acyclic double bond. Therefore, a reaction between another functional group with high reactivity and a vinyl group of the cyclohexenylene group may be inhibited. For example, a reaction between the vinyl group of the cyclohexenylene group and an oxime photoinitiator or an acetophenone photoinitiator used as a polymerization initiator, especially in the photo initiation process, may be minimized. Therefore, when the liquid crystal compound is introduced in a liquid crystal display, a reaction with the vinyl group of the cyclohexenylene group and another functional group with high reactivity may be prevented, so that a high voltage holding ratio may be obtained.

The liquid crystal compound represented by Chemical Formula 1-3 may correspond to Chemical Formula 1 where Y is —H and Z is —$CH_3$. The liquid crystal compound of Chemical Formula 1-3 may have a cyclohexenylene group to maintain a low rotary viscosity. Steric hindrance on the double bond may be caused by substituting Z of the cyclohexenylene ring with the —$CH_3$ group, so that the reactivity of the double bond of the cyclohexenylene may be reduced.

According to an exemplary embodiment of the present invention, the liquid crystal compound of Chemical Formula 1-2 may include at least one of liquid crystal compounds represented by Chemical Formulae 1-2-1 to 1-2-3 as follows:

[Chemical Formula 1-2-1]

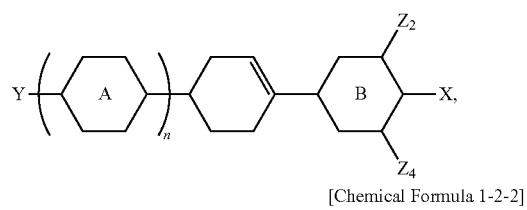

[Chemical Formula 1-2-2]

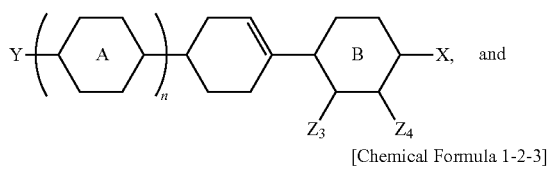
and

[Chemical Formula 1-2-3]

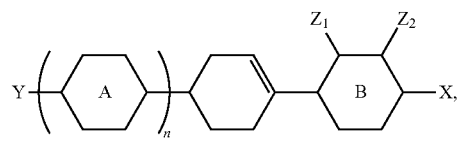

where Y may be H, and A, $Z_1$ to $Z_4$, B, n, and X may be as defined in Chemical Formula 1. According to an exemplary embodiment of the present invention, the liquid crystal compound of Chemical Formula 1-2 may include at least one of liquid crystal compounds represented by Chemical Formulae 1-2-4 and 1-2-5 as follows:

[Chemical Formula 1-2-4]

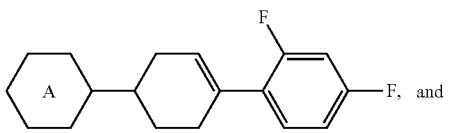
and

[Chemical Formula 1-2-5]

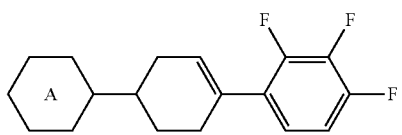

where A may be as defined in Chemical Formula 1.

According to an exemplary embodiment of the present invention, the liquid crystal compound of Chemical Formula 1-2 may include at least one of liquid crystal compounds represented by Chemical Formulae 1-2-6 to 1-2-11 as follows:

[Chemical Formula 1-2-6]

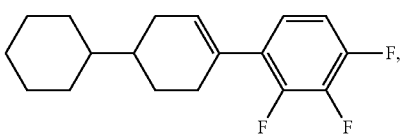

[Chemical Formula 1-2-7]

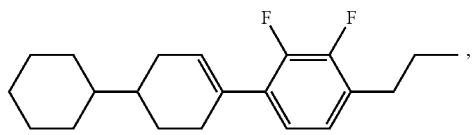

[Chemical Formula 1-2-8]

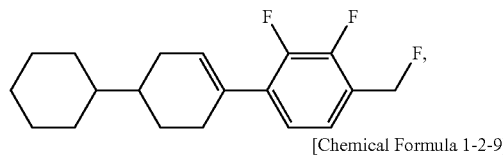

[Chemical Formula 1-2-9]

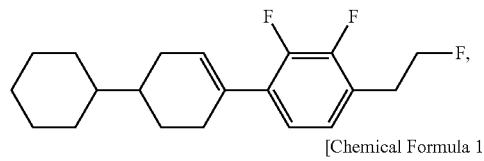

[Chemical Formula 1-2-10]

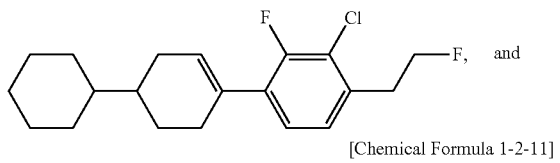

[Chemical Formula 1-2-11]

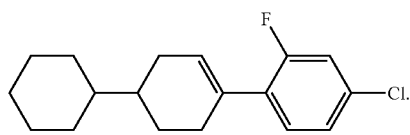

According to an exemplary embodiment of the present invention, the liquid crystal compound of Chemical Formula 1-3 may include at least one of liquid crystal compounds represented by Chemical Formulae 1-3-1 to 1-3-3 as follows:

[Chemical Formula 1-3-1]

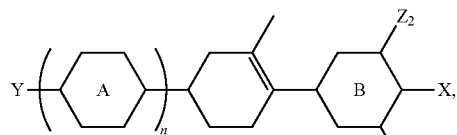

[Chemical Formula 1-3-2]

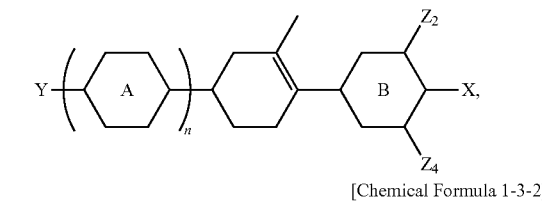

[Chemical Formula 1-3-3]

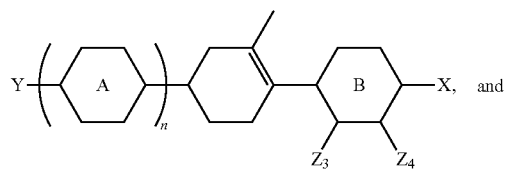

where Y, A, $Z_1$ to $Z_4$, B, n, and X may be defined as Chemical Formula 1.

According to an exemplary embodiment of the present invention, the liquid crystal compound of Chemical Formula 1-3 may include at least one of liquid crystal compounds represented by Chemical Formulae 1-3-4 to 1-3-5 as follows:

[Chemical Formula 1-3-4]

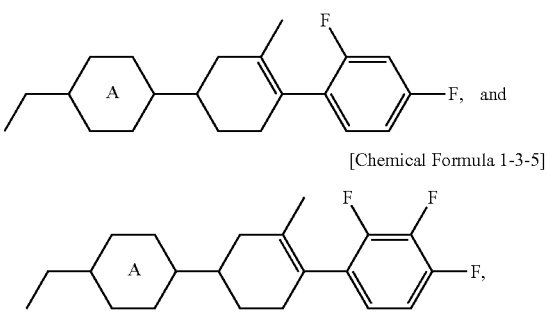

[Chemical Formula 1-3-5]

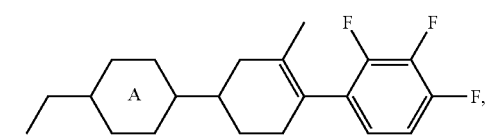

where A may be as defined in Chemical Formula 1.

According to an exemplary embodiment of the present invention, the liquid crystal compound of Chemical Formula 1-3 may include at least one of liquid crystal compounds represented by Chemical Formulae 1-3-6 to 1-3-12 as follows:

[Chemical Formula 1-3-6]

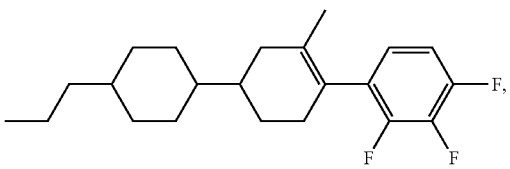

[Chemical Formula 1-3-7]

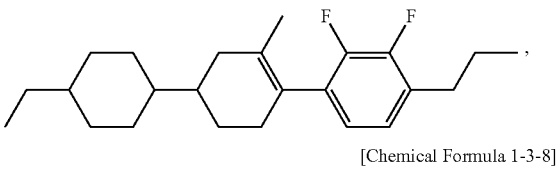

[Chemical Formula 1-3-8]

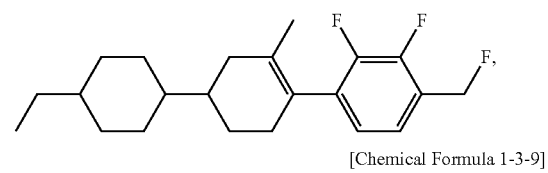

[Chemical Formula 1-3-9]

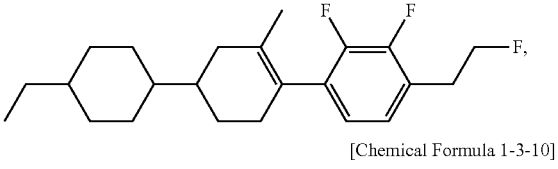

[Chemical Formula 1-3-10]

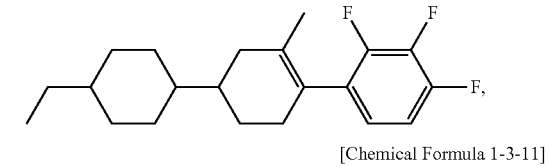

[Chemical Formula 1-3-11]

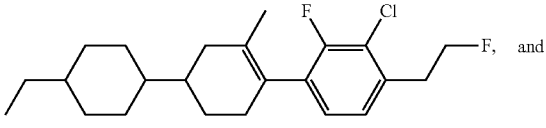

-continued

[Chemical Formula 1-3-12]

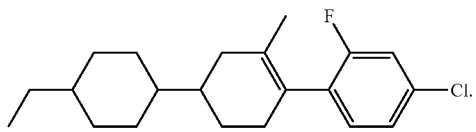

According to an exemplary embodiment of the present invention, the liquid crystal composition may further include a different type of liquid crystal having a similar rotary viscosity, such as low rotary viscosity, to Chemical Formula 1 and having a high voltage holding ratio when comprised in a liquid crystal display, for example, indene liquid crystal or dihydronaphthalene liquid crystal.

According to an exemplary embodiment of the present invention, the liquid crystal composition may include at least one of liquid crystal compounds represented by Chemical Formula 2 as follows:

[Chemical Formula 2]

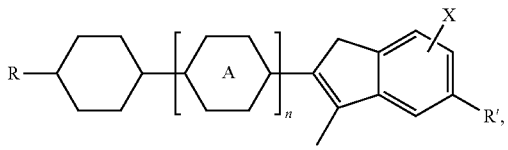

where A, n, and X may be as defined in Chemical Formula 1, and

R and R' may each, independently of one another, be alkyl or alkoxy having 1 to 4 C atoms.

According to an exemplary embodiment of the present invention, the liquid crystal compound of Chemical Formula 2 may be present in an amount exceeding 0 wt % but less than approximately 15 wt % based on the total weight of the liquid crystal composition. According to an exemplary embodiment of the present invention, the liquid crystal composition may comprise the liquid crystal compound of Chemical Formula 2 as well as the liquid crystal compound of Chemical Formula 1. The sum of the liquid crystal compound of Chemical Formula 1 and the liquid crystal compound of Chemical Formula 2 may be present in an amount exceeding 0 wt % but less than approximately 15 wt % based on the total weight of the liquid crystal composition.

According to an exemplary embodiment of the present invention, the liquid crystal composition may further include at least one of liquid crystal compounds represented by Chemical Formula 3 as follows:

[Chemical Formula 3]

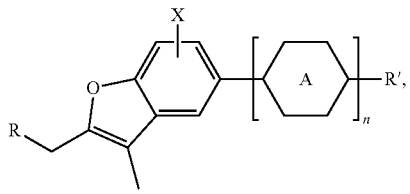

where A, n, and X may be as defined in Chemical Formula 1, and

R and R' may each, independently of one another, be alkyl or alkoxy having 1 to 4 C atoms.

According to an exemplary embodiment of the present invention, the liquid crystal compound of Chemical Formula 3 may be present in an amount exceeding 0 wt % but less than approximately 15 wt % based on the total weight of the liquid crystal composition. According to an exemplary embodiment of the present invention, the liquid crystal composition may comprise the liquid crystal compound of Chemical Formula 3 in addition to the liquid crystal compound of Chemical Formula 1. The sum of the liquid crystal compound of Chemical Formula 1 and the liquid crystal compound of Chemical Formula 3 may be present in an amount exceeding 0 wt % but less than approximately 15 wt % based on the total weight of the liquid crystal composition.

According to an exemplary embodiment of the present invention, the liquid crystal composition may further include both the liquid crystal of Chemical Formula 2 and the liquid crystal of Chemical Formula 3. The liquid crystal compound of Chemical Formula 1, the liquid crystal compound of Chemical Formula 2, and the liquid crystal compound of Chemical Formula 3 may be present in an amount exceeding 0 wt % but less than approximately 15 wt % based on the total weight of the liquid crystal composition.

As described above, the liquid crystal compound of Chemical Formula 1, 2 or 3 may be present in an amount exceeding 0 wt % but less than approximately 15 wt % based on the total weight of the liquid crystal composition, or any combination of the liquid crystal compound of Chemical Formula 1 and at least one of the liquid crystal compound of Chemical Formula 2 and the liquid crystal compound of Chemical Formula 3, is present in an amount exceeding 0 wt % but less than 15 wt % based on a total weight of the liquid crystal composition.

According to an exemplary embodiment of the present invention, the liquid crystal composition may further include a monomer which is polymerized to form an alignment layer. The monomer may be represented by Chemical Formula 4 as follows:

[Chemical Formula 4]

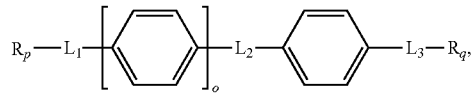

where $R_p$ and $R_q$ may be 1 to 6 functional groups independently being a reactive site for polymerization, and the functional group may be an acrylate group having 1 to 12 C atoms, a methacrylate group, an epoxy group, an oxetane group, a vinyl-ether group, or a styrene group, $L_1$ to $L_3$ may each, independently of one another, be a single bond, an alkyl group having 1 to 10 C atoms, ether, carbonyl, or carboxyl, and o may be 1 or 2.

According to an exemplary embodiment of the present invention, the liquid crystal composition may further include an initiator for initiating polymerization of the monomer. The initiator may be a photoinitiator or a thermal initiator. According to an exemplary embodiment of the present invention, the photoinitiator may be used. An oxime photoinitiator and an acetophenone photoinitiator may be used as the photoinitiator.

After the liquid crystal composition is provided between the two substrates of the liquid crystal display, when light, such as ultraviolet rays, is applied to the liquid crystal composition, polymerization of the monomer may be initiated by the photoinitiator, and the polymerized polymer may be an alignment layer. For example, the monomer in the liquid crystal composition may be represented by Chemical Formula 4, and the photoinitiator may be an oxime photoinitiator or an acetophenone photoinitiator.

According to an exemplary embodiment of the present invention, the liquid crystal composition may further include various liquid crystal compounds having optimal dielectric anisotropy, optimal refractive index anisotropy, low rotary viscosity, and high voltage holding ratio for the liquid crystal display in addition to the above-described liquid crystal compound.

According to an exemplary embodiment of the present invention, the liquid crystal composition may include at least one of liquid crystal compounds represented by the following Chemical Formula 5:

[Chemical Formula 5]

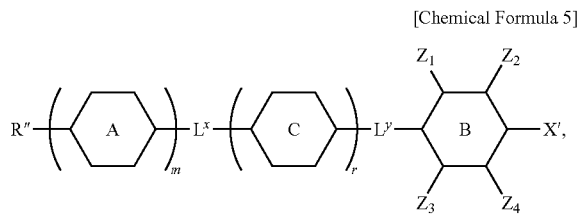

where R" may represent hydrogen or alkyl having 1 to 15 C atoms, in which one or more —$CH_2$— groups may each, independently of one another, be substituted by —C≡C—, —$CF_2O$—, —CH=CH—, —O—, —CO—O—, —O—CO— or —O—CO—O— so that O atoms may not be directly linked to each other, and 1 to 3 H atoms may be substituted by halogen, A, B, and C may each, independently of one another, be 1,4-cyclohexylene or 1,4-phenylene, m and r may each, independently of one another, be 0 to 2, $L^x$ and $L^Y$ may each, independently of one another, be a single bond, —C≡C—, —COO—, —OCO—, —$CF_2O$—, —$OCF_2$—, —$CH_2O$—, —CO—, —O—, —$(CH_2)_2$—, or —CH=CH—, $Z_1$ to $Z_4$ may each, independently of one another, be H, F, Cl, —$OCF_3$, —$CF_3$, —$CHF_2$, or —$CH_2F$, and X' may represent hydrogen, F, Cl, or alkyl having 1 to 15 C atoms, in which one or more —$CH_2$— groups may each, independently of one another, be substituted by —C≡C—, —$CF_2O$—, —CH=CH—, —CO—, —O—, —CO—O—, —O—CO— or —O—CO—O— so that O atoms may not be directly linked to each other, and 1 to 3 H atoms may be substituted by halogen.

In the Chemical Formula 5 above, the structures like —$OCF_3$, —$CF_3$, —$CHF_2$, and —$CH_2F$ may also be represented as $OCF_3$, $CF_3$, $CHF_2$, and $CH_2F$, respectively. The extra "—" to each structure here is to show the linkages of these groups.

According to an exemplary embodiment of the present invention, the liquid crystal compound of Chemical Formula 5 may include at least one of liquid crystal compounds represented by Chemical Formulae 5-1 to 5-8 as follows:

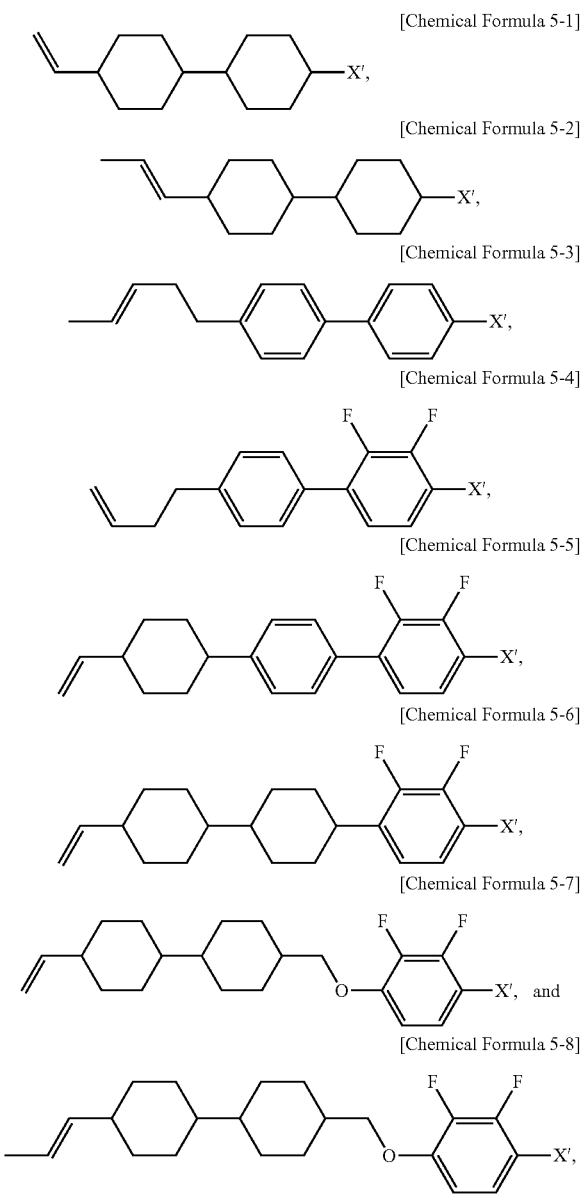

where X' may be as defined in Chemical Formula 5.

The liquid crystal compounds of Chemical Formulae 5-1 to 5-8 may have a low rotary viscosity. In the liquid crystal compounds of Chemical Formulae 5-1 to 5-8, a vinyl group may be provided to a terminal group linked to the ring. Since the vinyl group has relatively high reactivity, the vinyl group may react with oxygen or water, or an initiator when light, such as ultraviolet rays, is applied when formed in a liquid crystal display. An organic spacer, a color filter, a black matrix, an alignment layer, and an encapsulant in the liquid crystal display may include an organic polymer, and an initiator included in the liquid crystal display may be used for the polymerization of a monomer to form the organic polymer. The liquid crystal compounds of Chemical Formulae 5-1 to 5-8 may react with the initiator after heat or photo initiation and may polymerize to form the organic polymer. When the liquid crystal compound reacts with the initiator after initiation, a voltage holding ratio may be reduced.

Although the liquid crystal compounds of Chemical Formulae 5-1 to 5-8 are present in the liquid crystal composition according to an exemplary embodiment of the invention, a voltage holding ratio may be maintained by the liquid crystal compounds represented by Chemical Formulae 1 to 3. Chemical Formulae 1 to 3, each include at least one double bond in a cyclic structure, and the double bond in the cyclic structure is less reactive than the double bond in Chemical Formulae 5-1 to 5-8.

The above-described liquid crystal composition may further include various additives generally used in the technical field to which the present invention pertains in addition to the above-described liquid crystal compound. More specifically, the liquid crystal composition may further include an antioxidant. In addition, the liquid crystal composition may further include a stabilizer. Various materials may be used as the stabilizer. For example, a hindered amine light stabilizer (HALS) may be used.

The liquid crystal composition according to an exemplary embodiment of the present invention may be comprised in the liquid crystal layer of the liquid crystal display. The liquid crystal composition according to an exemplary embodiment of the present invention may be formed in liquid crystal displays in various modes, for example, a vertical alignment (VA) mode, a fringe field switching (FFS) mode, an in plane switching (IPS) mode, and a plane to light switching (PLS) mode. According to an exemplary embodiment of the present invention, the liquid crystal composition has a low rotary viscosity, and at the same time has a high voltage holding ratio when comprised in the liquid crystal display. Therefore, when the above-described liquid crystal composition is comprised in the liquid crystal display, a high quality image may be displayed. This will be described below with the drawings.

FIG. 1 is a schematic block diagram showing a liquid crystal display according to an exemplary embodiment of the present invention.

Referring to FIG. 1, the liquid crystal display may include a display panel PNL, a timing controller TC, a gate driver GDV, and a data driver DDV.

The display panel PNL may be a liquid crystal panel including a first substrate, a second substrate, and a liquid crystal layer interposed between the first and second substrates.

The display panel PNL may include a plurality of gate lines GL to GLm extending in a first direction D1 (e.g., a row direction) and a plurality of data lines DL1 to DLn extending in a second direction D2 (e.g., a column direction) crossing the first direction D1. The display panel PNL may include a plurality of pixels PX. The plurality of pixels PX may be arranged in the first direction D1 and the second direction D2.

The timing controller TC may receive image data RGB and control signals from an external graphic control unit. The control signals may include a vertical synchronization signal Vsync which is a frame distinguishing signal, a horizontal synchronization signal Hsync which is a row distinguishing signal, a data enable signal DES having a high level HIGH only during a period in which data are output so as to indicate an area where the data are input, and a main clock signal MCLK.

The timing controller TC may convert the image data RGB according to the specifications of the data driver DDV and output the converted image data DATA to the data driver DDV. The timing controller TC may generate a gate control signal GS1 and a data control signal DS1 based on the control signals. The timing controller TC may output the gate control signal GS1 to the gate driver GDV and output the data control signal DS1 to the data driver DDV. The gate control signal GS1 may be a signal for driving the gate driver GDV and the data control signal DS1 may be a signal for driving the data driver DDV.

The gate driver GDV may generate gate signals based on the gate control signal GS1 and output the gate signals to the gate lines GL1 to GLm. The gate control signal GS1 may include a scanning start signal for instructing to start scanning, at least one clock signal for controlling an output period of a gate on voltage, and an output enable signal for limiting the duration time of the gate on voltage.

The data driver DDV may generate a grayscale voltage according to the image data DATA based on the data control signal DS1 and output a data voltage to the data lines DL1 to DLn. The data voltage may include a positive data voltage having a positive value and a negative data voltage having a negative value with respect to a common voltage. The data control signal DS1 may include a horizontal start signal indicating that the image data DATA starts to be transmitted to the data driver DDV, a load signal instructing to apply the data voltage to the data lines DL1 to DLn, and an inversion signal for inverting the polarity of the data voltage with respect to the common voltage.

Each of the timing controller TC, the gate driver GDV, and the data driver DDV may be directly mounted in the form of at least one integrated circuit chip onto the display panel PNL, may be mounted over a flexible printed circuit board and attached in the form of a tape carrier package (TCP) to the display panel PNL, or may be mounted over a separate printed circuit board. However, at least one of the gate driver GDV and the data driver DDV may be integrated in the display panel PNL, together with the gate lines GL1 to GLm, the data lines DL1 to DLn, and a transistor. In addition, the timing controller TC, the gate driver GDV, and the data driver DDV may be integrated into a single chip.

Figure 2:
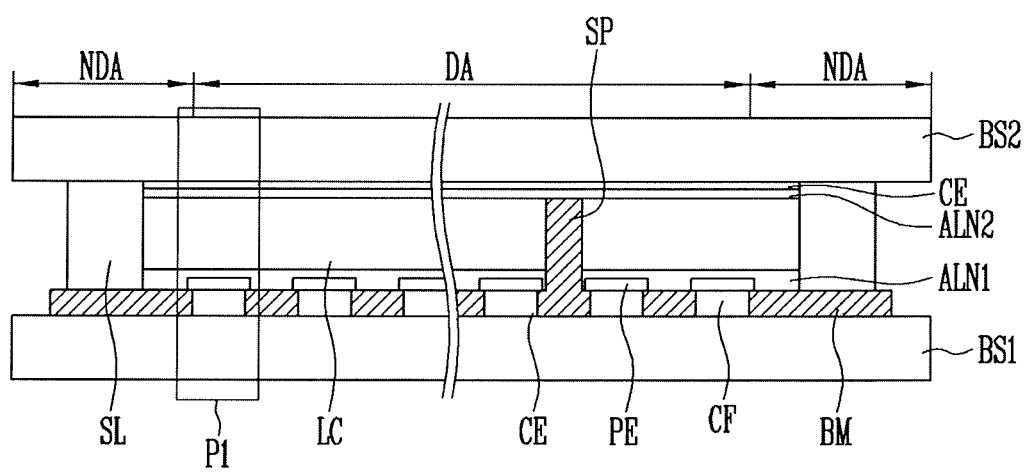
FIG. 2 is a cross-sectional diagram showing a liquid crystal display according to an exemplary embodiment of the present invention.
Figure 3A:
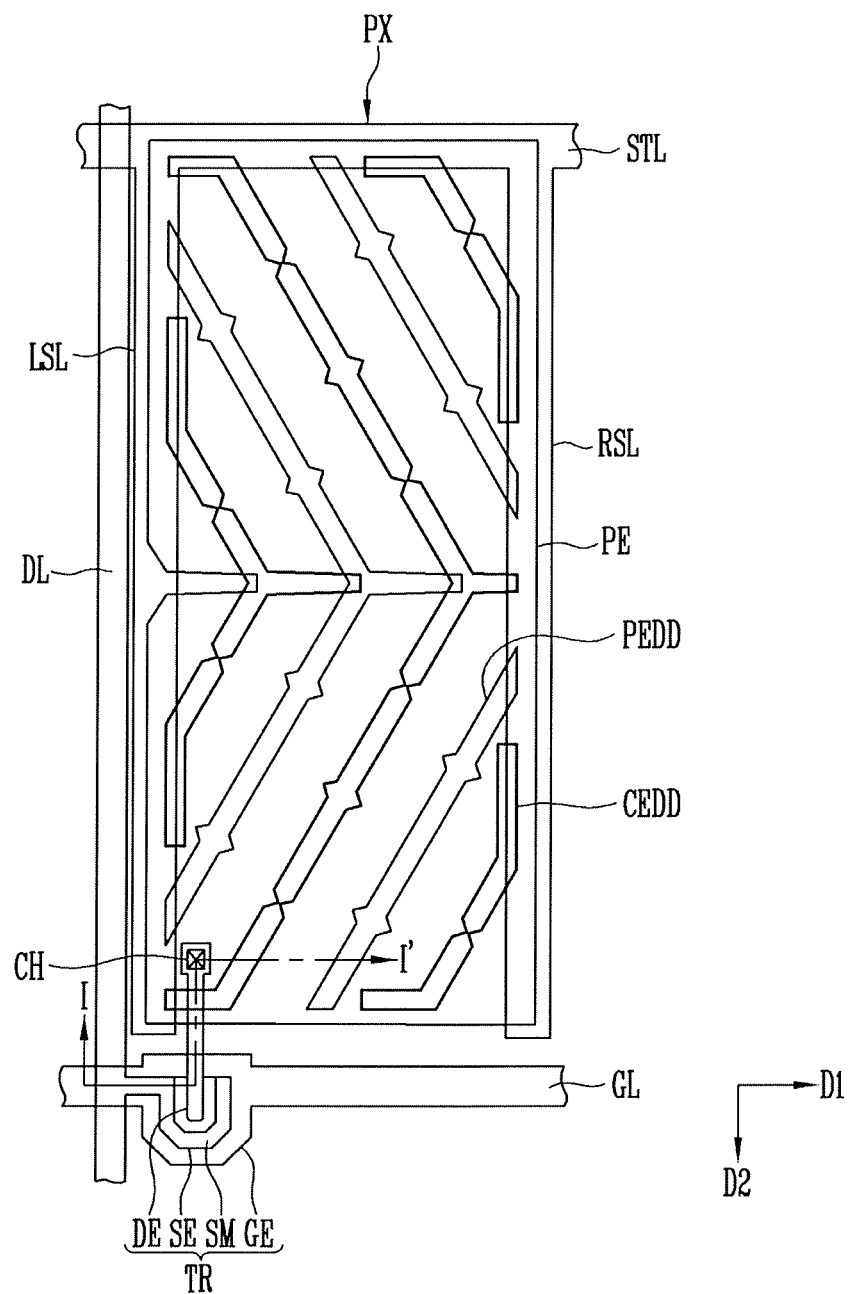
FIG. 3A is a plan view illustrating a liquid crystal display according to an exemplary embodiment of the present invention and FIG. 3B is a cross-sectional view taken along line I-I' of FIG. 3A.
Figure 3B:
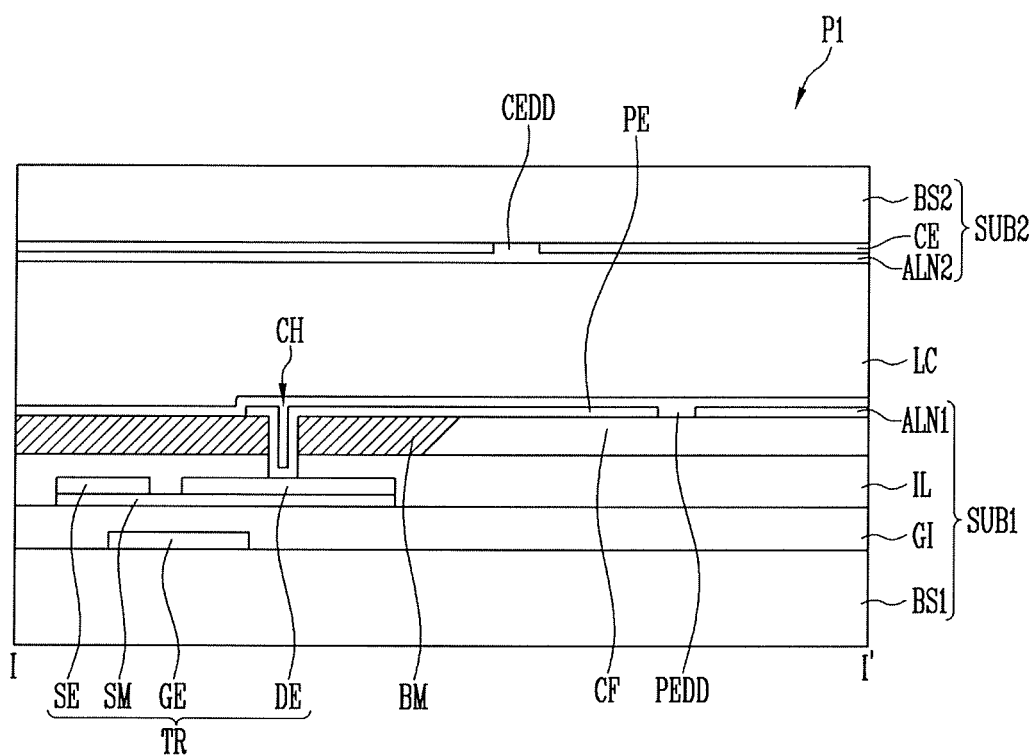
Figure 4A:
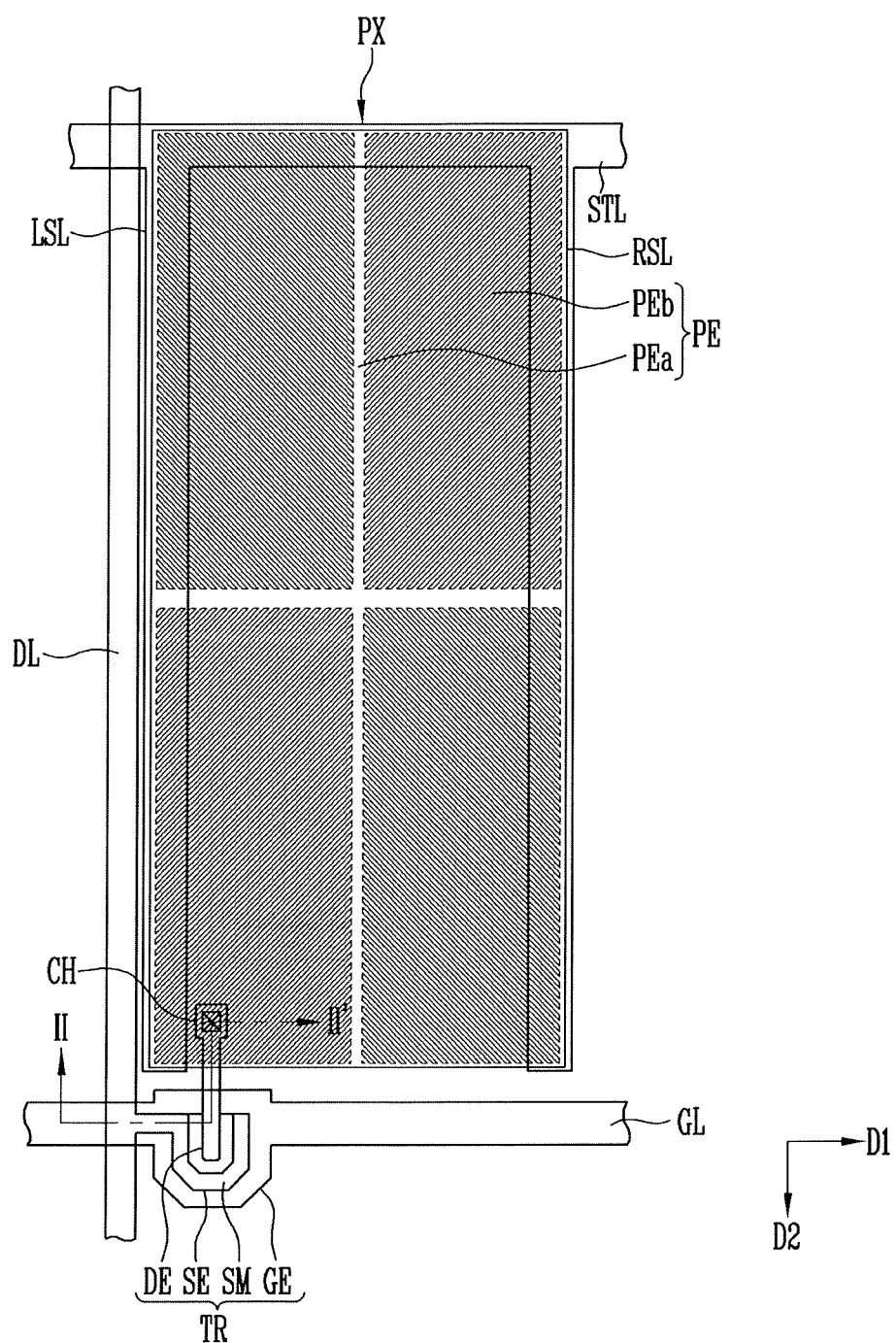
FIG. 4A is a plan view illustrating a liquid crystal display according to an exemplary embodiment of the present invention.
Figure 4B:
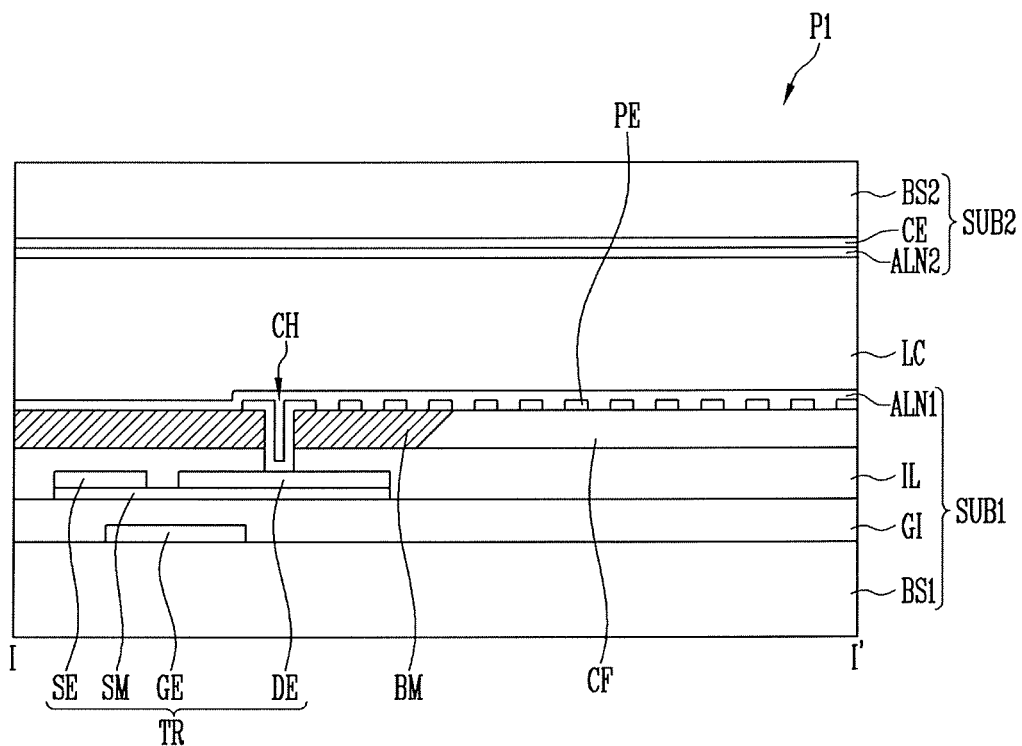
FIG. 4B is a cross-sectional view taken along line II-II' of FIG. 4A.
Figure 7:
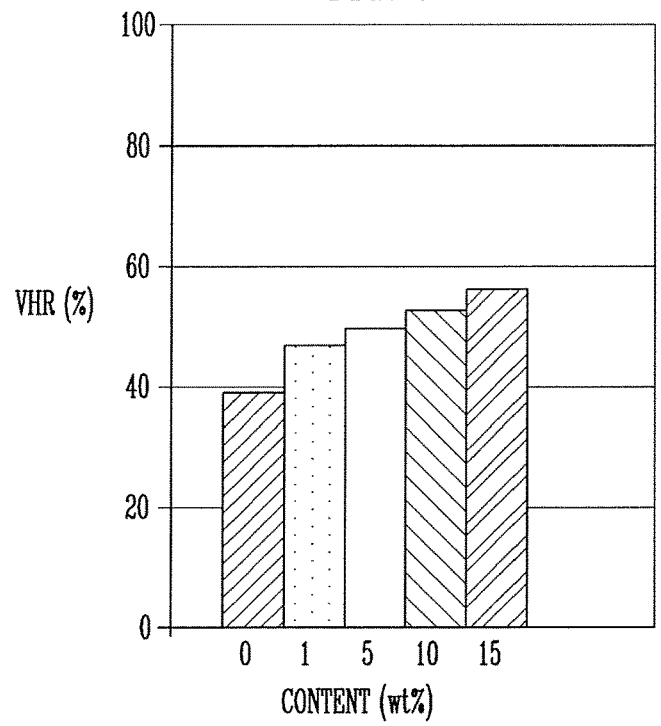
Figure 8:
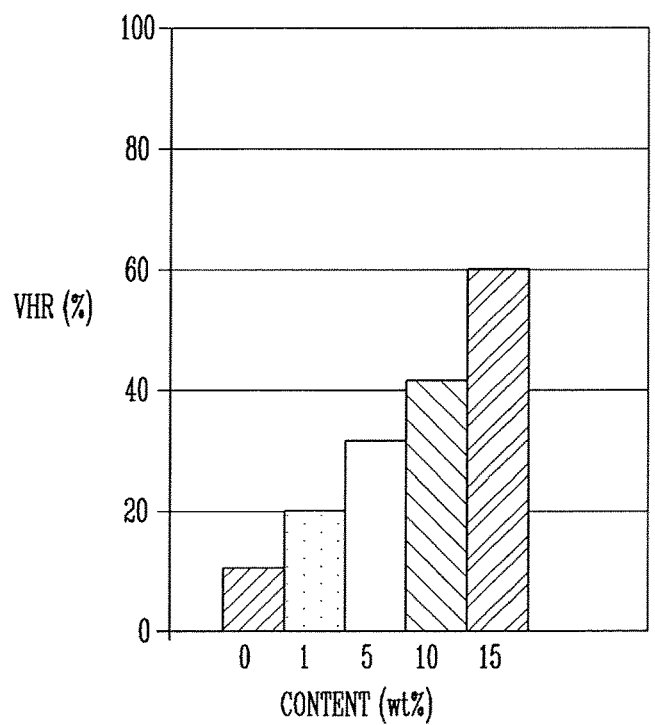

FIG. 2 is a schematic cross-sectional view illustrating a liquid crystal display according to an exemplary embodiment of the present invention. The liquid crystal display shown in FIG. 2 may be embodied in various configurations. FIG. 3A is a plan view illustrating a liquid crystal display according to an exemplary embodiment of the present invention. FIG. 3B is a cross-sectional view taken along line I-I' of FIG. 3A. FIG. 4A is a plan view illustrating a liquid crystal display according to an exemplary embodiment of the present invention, and FIG. 4B is a cross-sectional view taken along line II-II' of FIG. 4A. FIGS. 3B and 4B are cross-sectional views illustrating a portion P1 of the liquid crystal display shown in FIG. 2.

Referring to FIGS. 2, 3A and 3B, according to an exemplary embodiment of the present invention, the liquid crystal display may include a first substrate SUB1, a second substrate SUB2 opposing the first substrate SUB1, a liquid crystal layer LC provided between the first substrate SUB1 and the second substrate SUB2, a spacer SP provided between the first substrate SUB1 and the second substrate SUB2 and maintaining a distance between the first substrate SUB1 and the second substrate SUB2, and an encapsulant SL provided between the first substrate SUB1 and the second substrate SUB2 and encapsulating the liquid crystal layer LC.

The first substrate SUB1 may include a first base substrate BS1, a wiring unit provided on the first base substrate BS1, a plurality of pixels PX coupled to the wiring unit, color filters CF provided to correspond to the pixels PX, a black matrix BM surrounding the color filters CF and provided in a region where an image is not displayed, and a first alignment layer ALN1 provided over the pixels PX.

The first substrate SUB1 may include a display area DA where an image is displayed and a non-display area NDA where an image is not displayed. The non-displayed area NDA may be provided on at least one side of the display area DA. The pixel PX may be a minimum unit for displaying an image and may be provided in the display area DA.

The pixel PX may be coupled to a corresponding data line among sequentially arranged data lines, and a corresponding gate line among neighboring gate lines. According to an exemplary embodiment of the present invention, for convenience of explanation, a gate line to which one pixel is connected may be denoted by GL and a data line to which the above pixel PX is connected may be denoted by DL.

The pixel PX may be connected to a transistor TR, and the transistor TR may be connected to the gate line GL and the data line DL.

Each of the pixels PX may include a thin film transistor, a pixel electrode PE connected to the thin film transistor TR, and a storage electrode portion.

The first base substrate BS1 may have a substantially rectangular shape and may include a transparent insulating material.

The wiring unit may include the gate line GL and the data line DL.

The gate line GL may extend in the first direction D1 on the first base substrate BS1.

A gate insulating layer GI may be provided on the first base substrate BS1 on which the gate line GL is formed, and may include an insulating material, for example, a silicon nitride or a silicon oxide.

The data line DL may extend in the second direction D2 crossing the first direction D1 while interposing the gate line GL and the gate insulating layer GI.

The transistor TR may be coupled between the gate line GL and the data line DL. Referring to FIG. 1, for the entirety of the pixels PX, a plurality of the gate lines, a plurality of the data lines and a plurality of the transistors may be provided. Each of the transistors may be connected to a corresponding one of the plurality of gate lines and a corresponding one of the plurality of data lines. The transistor TR may include a gate electrode GE, a semiconductor pattern SM, a source electrode SE, and a drain electrode DE.

The gate electrode GE may protrude from the gate line GL or be provided in a portion of the gate line GL.

The gate electrode GE may include metal. The gate electrode GE may include, for example, nickel, chrome, molybdenum, aluminum, titanium, copper, tungsten, or an alloy thereof. The gate electrode GE may include a single layer or a multilayer including the metal. For example, the gate electrode GE may be a triple layer in which molybdenum, aluminum, and molybdenum are sequentially stacked, or a dual layer in which titanium and copper are sequentially stacked. Alternatively, the gate electrode GE may be a single layer including an alloy of titanium and copper.

The semiconductor pattern SM may be provided on the gate electrode GE with the gate insulating layer GI interposed therebetween. A portion of the semiconductor pattern SM may overlap with the gate electrode GE. The semiconductor pattern SM may include a doped or undoped silicon thin film. The silicon thin film may be crystalline or amorphous. The semiconductor pattern SM may include a crystalline or amorphous oxide semiconductor thin film.

The source electrode SE may be branched off from the data line DL, and may be formed on the semiconductor pattern SM and partially overlapping with the gate electrode GE.

The drain electrode DE may be separated from the source electrode SE and electrically connected to the semiconductor pattern SM. The drain electrode DE may be formed on the semiconductor pattern SM, and may partially overlap with the gate electrode GE.

The source electrode SE and the drain electrode DE may include, for example, nickel, chrome, molybdenum, aluminum, titanium, tungsten, or an alloy thereof. Each of the source electrode SE and the drain electrode DE may be a single layer or a multilayer including the above metal. For example, each of the source electrode SE and the drain electrode DE may be a dual layer in which titanium and copper are sequentially stacked, or a single layer including an alloy of titanium and copper.

Since the source electrode SE and the drain electrode DE are separated from each other, a top surface of the semiconductor pattern SM between the source electrode SE and the drain electrode DE may be exposed. The semiconductor pattern SM between the source electrode SE and the drain electrode DE may form a conductive channel between the source electrode SE and the drain electrode DE when a voltage, which is higher than a threshold voltage, of the gate electrode GE is applied.

The storage electrode portion may include a storage line STL extending in the first direction D1 and further include first and second branch electrodes LSL and RSL branched off from the storage line STL and extending in the second direction D2.

An interlayer IL may be provided on the source electrode SE and the drain electrode DE, and may include an organic or inorganic insulating material, for example, a silicon nitride or a silicon oxide.

The color filter CF and the black matrix BM may be provided on the interlayer IL.

A plurality of the color filters CF may be provided to the plurality of pixels PX, respectively. The color filters CF may display red, green, and blue. However, the present invention is not limited thereto. The color filters CF may display various colors including white, yellow, cyan, and magenta.

According to an exemplary embodiment of the present invention, the color filter CF may include a polymerized organic polymer. The color filter CF may include an initiator for initiating polymerization of a monomer. The polymerized organic polymer included in the color filter CF may be formed by polymerizing the monomer. The initiator may be a photoinitiator, for example, an oxime or acetophenone initiator.

The black matrix BM may surround spaces between the color filters CF in the display area and block light transmitting the liquid crystal layer LC between neighboring pixels. In addition, the black matrix BM may be provided in the non-display area NDA and block light transmitting through the non-display area NDA.

According to an exemplary embodiment of the present invention, the black matrix BM may include a polymerized organic polymer. The black matrix BM may include an initiator for initiating polymerization of a monomer. The polymerized organic polymer included in the black matrix BM may be formed by polymerizing the monomer. The initiator may be a photoinitiator, for example, an oxime or acetophenone initiator.

According to an exemplary embodiment of the present invention, it is illustrated that the color filter CF is provided on the first substrate SUB1. However, the invention is not limited thereto. In an exemplary embodiment of the present invention, the color filter CF may be provided on the second substrate SUB2. A contact hole CH through which an upper surface of the drain electrode DE is exposed may be provided on and penetrating through the interlayer IL and the black matrix BM.

According to an exemplary embodiment of the present invention, it is illustrated that the interlayer IL is a single layer and the color filters CF and the black matrix BM are formed on the interlayer IL. However, the invention is not limited thereto. For example, an insulating layer like the interlayer IL may be a multilayer. An additional insulating layer may also be provided over the color filter CF and the black matrix BM. In addition, the color filter CF and the black matrix BM may be provided at various positions. For example, the color filter CF and the black matrix BM may be provided between the first base substrate BS1 and the gate insulating layer GI.

The pixel electrode PE may be provided on the black matrix BM and connected to the drain electrode DE through the contact hole CH.

The pixel electrode PE may include a first domain partition unit PEDD dividing the pixel PX into a plurality of domains. The first domain partition unit PEDD may be a cut portion or a protrusion formed by patterning the pixel electrode PE. The cut portion may be an aperture or a slit formed by partially removing the pixel electrode PE. The first domain partition unit PEDD may include a horizontal portion extending in parallel in the first direction or the second direction to divide the pixel PX in a length direction into two parts and oblique portions inclined with respect to the first direction or the second direction. The oblique portions may be substantially linearly symmetrical with respect to the horizontal portion.

The pixel electrode PE may be formed of a transparent conductive material such as, for example, a transparent conductive polymer, a transparent conductive oxide, or the like. The transparent conductive oxide may be, for example, an indium tin oxide (ITO), an indium zinc oxide (IZO), or an indium tin zinc oxide (ITZO).

The first alignment layer ALN1 may be provided on the pixel electrode PE, and may include a polymer obtained by polymerizing the monomer represented by Chemical Formula 4. The monomer of Chemical Formula 4 may have 1 to 6 functional groups, which may be triggered to polymerize, as a terminal group, and polymerization may be caused by these function groups. The functional group may include, for example, an acrylate group of 1 to 12 C atoms, a methacrylate group, an epoxy group, an oxetane group, a vinyl-ether group, or a styrene group. Other functional groups than described above may also be used.

The second substrate SUB2 may oppose the first substrate SUB1. The second substrate SUB2 may include a second base substrate BS2, a common electrode CE, and a second alignment layer ALN2.

The common electrode CE may be provided on the second base substrate BS2.

The common electrode CE may include a transparent conductive material such as, for example, a transparent conductive polymer, a transparent conductive oxide, or the like. The transparent conductive oxide may be, for example, an indium tin oxide (ITO), an indium zinc oxide (IZO), or an indium tin zinc oxide (ITZO).

The common electrode CE may include a second domain partition unit CEDD for dividing the pixel PX into a plurality of domains. The second domain partition unit CEDD may be a cut portion or a protrusion formed by patterning the common electrode CE. The cut portion may be an aperture formed by partially removing the common electrode CE. The second domain partition unit CEDD may include a horizontal portion and/or a vertical portion extending in parallel in the first direction or the second direction to divide the pixel PX in the length direction into two parts, and oblique portions inclined with respect to the first direction or the second direction. The oblique portions may be substantially linearly symmetrical with respect to the horizontal portion.

The horizontal portion of the first domain partition unit PEDD and the horizontal portion of the second domain partition unit CEDD may be substantially collinearly located. The oblique portions of the first domain partition unit PEDD and the oblique portions of the second domain partition unit CEDD may be arranged next to each other in the same direction. In addition, the oblique portions of the first domain partition unit PEDD and the oblique portions of the second domain partition unit CEDD may alternate with each other.

The second alignment layer ALN2 may be provided on the second base substrate BS2, and may include a polymer obtained by polymerizing the monomer represented by Chemical Formula 4.

According to an exemplary embodiment of the present invention, the first alignment layer ALN1, the second alignment layer ALN2, and/or the liquid crystal layer LC to be described below may include an initiator for initiating the polymerization of the monomer represented by Chemical Formula 4. The initiator may be an oxime or acetophenone initiator.

The spacer SP may be provided between the first substrate SUB1 and the second substrate SUB2. One side of the spacer SP may contact the first substrate SUB1 and the other side of the spacer SP may contact the second substrate SUB2 to maintain a distance between the first substrate SUB1 and the second substrate SUB2.

The spacer SP may include a polymerized organic polymer. The spacer SP may contain an initiator for initiating the polymerization of a monomer. The polymerized organic polymer included in the spacer SP may be formed by polymerizing the monomer. The initiator may be a photoinitiator, for example, an oxime or acetophenone initiator.

According to an exemplary embodiment of the present invention, the spacer SP may include a material the same as that of the black matrix BM. The spacer SP and the black matrix BM may be formed by the same process. In addition, the spacer SP may be formed integrally with a portion of the black matrix BM.

The encapsulant SL may be provided on the circumference of the liquid crystal layer LC between the first substrate SUB1 and the second substrate SUB2. The encapsulant SL may be provided in the non-display area NDA and may externally seal the liquid crystal layer LC between the first substrate SUB1 and the second substrate SUB2.

The encapsulant SL may include a polymerized organic polymer. The encapsulant SL may include an initiator for initiating the polymerization of a monomer. The polymerized organic polymer included in the encapsulant SL may be formed by polymerizing the monomer. The initiator may be a photoinitiator, for example, an oxime or acetophenone initiator.

The liquid crystal layer LC may include the above-described liquid crystal composition according to an exemplary embodiment of the present invention.

According to an exemplary embodiment of the present invention, elements which may include organic polymers, among the elements forming the liquid crystal display, i.e., the first and second alignment layers ALN1 and ALN2, the spacer SP, the color filters CF, the black matrix BM may be formed by polymerizing a monomer, and the oxime or acetophenone initiator may be included as the initiator for initiating the polymerization. However, the invention is not limited thereto. For example, none of the elements may include organic polymers, and only some of the first and second alignment layers, the spacer, the color filters, and the black matrix may include organic polymers. In addition, another element, for example, an insulating layer may include an organic polymer. In addition, the above elements may include a different type of initiator. To reduce reactivity between different types of initiator and a liquid crystal compound, the liquid crystal compound according to an exemplary embodiment of the present invention may be used.

According to an exemplary embodiment of the present invention, the pixel PX may be driven by the transistor TX. In other words, when the transistor TR is turned on in response to a gate signal provided from the GL, a data voltage provided through the data line DL may be provided to the pixel electrode PE through the turned-on transistor TR. Therefore, an electric field may be formed between the pixel electrode PE to which the data voltage is applied and the common electrode CE to which the common voltage is applied. Liquid crystal molecules of the liquid crystal layer LC may be driven by the electric field, so that an image may be displayed according to the amount of light transmitting through the liquid crystal layer LC.

A liquid crystal display according to an exemplary embodiment of the present invention is described below with reference to FIGS. 2, 4A and 4B. To avoid redundancy, contents different from the above description will be mainly described and undescribed portions comply with the above description.

Referring to FIGS. 2, 4A and 4B, according to an exemplary embodiment of the present invention, a liquid crystal display may include the first substrate SUB1, the second substrate SUB2 opposing the first substrate SUB1, and the liquid crystal layer LC provided between the first substrate SUB1 and the second substrate SUB2.

Each of the pixels PX may include the thin film transistor TR, the pixel electrode PE coupled to the thin film transistor TR, and the storage electrode portion.

The pixel electrode PE may include a stem portion PEa and a plurality of branch portions PEb radially extending from the stem portion PEa. Neighboring branch portions PEb may be adjacent to each other with a slit interposed therebetween. The stem portion PEa or some of the branch portions PEb may be coupled to the drain electrode DE through the contact hole CH.

The stem portion PEa may have various shapes. For example, in an exemplary embodiment of the present invention, the stem portion PEa may have a cross shape. The pixel PX may be divided into a plurality of domains by the stem portion PEa. The branch portions PEb may correspond to each domain and extend in different directions in the respective domains. According to an exemplary embodiment of the present invention, it is illustrated that the pixel PX has four domains. The branch portions PEb may be separated from each other so as not to meet neighboring branch portions PEb and extend in parallel with each other in the area divided by the stem portion PEa. Slits between neighboring branch portions PEb may be separated from each other by a distance in a range of micrometers. These slits may correspond to a domain partition unit for arranging liquid crystal molecules of the liquid crystal layer LC at a predetermined angle on a plane parallel with the base substrate.

The second substrate SUB2 may include the second base substrate BS2, and the color filters CF, the black matrix BM, the common electrode CE, and the second alignment layer ALN2 may be provided on the second base substrate BS2. A separate domain partition unit may not be provided to the common electrode CE, and therefore may be provided in the form of a single whole plate.

A liquid crystal display according to an exemplary embodiment of the present invention may have various pixel structures. For example, according to an exemplary embodiment of the present invention, it is illustrated that the pixel electrode is included in the first substrate and the common electrode is included in the second substrate. However, the positions of the pixel electrode and the common electrode may not be limited thereto. According to an exemplary embodiment of the present invention, a pixel electrode and a common electrode may be formed at different positions where the pixel electrode and the common electrode are located as described above, and both the pixel electrode and the common electrode may be included in the first substrate without departing from the scope of the invention. In addition, according to an exemplary embodiment of the present invention, the pixel electrode and the common electrode may have other shapes without departing from the scope of the invention. Accordingly, an electrode portion may be provided on at least one of the first and second substrates of the liquid crystal display. The electrode portion may include, for example, a pixel electrode, a common electrode, a storage electrode portion, or other electrode required for a liquid crystal display.

According to an exemplary embodiment of the present invention, two gate lines and one data line may be coupled to a single pixel, and according to an exemplary embodiment of the present invention, one gate line and two data lines may be coupled to one pixel. Alternatively, one pixel may have two sub-pixels to which two different voltages are applied. In this embodiment, a high voltage may be applied to one of the two sub-pixels and a low voltage may be applied to the other sub-pixel. In addition, according to an exemplary embodiment of the present invention, respective elements in the pixel, for example, the gate electrode, the source electrode and the drain electrode may be arranged in a different manner as illustrated above.

EXAMPLES

In the present invention, central groups, connecting groups and terminal groups included in liquid crystal compounds of Examples and comparative examples are represented as follows:

| Type | Structure | Symbol |
|---|---|---|
| Central group |  | B |
|  |  | H |

-continued

| Type | Structure | Symbol |
|---|---|---|
| | (F-substituted benzene) | B(2F) |
| | (cyclohexene) | ch |
| | (cyclohexene with 3-methyl) | ch(3C) |
| | (cyclohexene with F) | ch(3F) |
| | (difluorobenzene) | B(2F, 3F) |
| | (trifluorobenzene) | B(F, F) |
| Connecting group | —$C_nH_{2n}$—<br>—O— | n(number)<br>O |
| Terminal group | —H<br>—$C_nH_{2n+1}$<br>—$OC_nH_{2n+1}$ | 0(number)<br>n(number)<br>On(number) |
| | (vinyl) | V |
| | (allyl) | V1 |
| | —F | F |

There is no particular indication between the central group and the connecting group, and the central/connecting group and the terminal group are separated by "—"

Properties of the liquid crystal compositions in the comparative examples and the Examples were measured by the following method:

1) Dielectric Anisotropy

After a sample having a cell gap of 30 μm was mixed with liquid crystal compositions of the Examples and the comparative examples, horizontal and vertical dielectric constants were obtained at 1 kHz and 0.3V, and dielectric anisotropy was obtained by subtracting the horizontal dielectric constant from the vertical dielectric constant at 20 degrees.

2) Refractive Index Anisotropy

An abbe refractometer at 589 nm was used for measurement. Liquid crystals were vertically aligned using lecithin to obtain refractive index anisotropy at 20 degrees.

3) Rotary Viscosity

Rotary viscosity was measured at 20° C. and 90V/20 μs by inputting a dielectric anisotropy value at 20° C.

4) Voltage Holding Ratio (VHR)

Two substrates each including an electrode and a horizontal alignment layer formed thereon were attached to each other with a cell gap of 3 μm. Subsequently, a liquid crystal composition was injected therein, and UV light exposure was carried out thereon. A voltage of 1V was applied to a corresponding liquid crystal cell for 60 us at 60° C., and a voltage holding ratio (VHR) of the liquid crystal cell was measured in unit of 60 Hz.

1. Rotary Viscosity Evaluation 1

(1) First Liquid Crystal Composition

Refractive index anisotropy (Δn), dielectric anisotropy (Δε), and rotary viscosity (γ1) of liquid crystal compositions according to respective contents (0 wt %, 1 wt %, 5 wt %, and 10 wt %) of liquid crystal compounds represented by Chemical Formula 6 below are shown in Tables 1 to 4. The contents of the comparative example and the Examples below were represented by wt %.

[Chemical Formula 6]

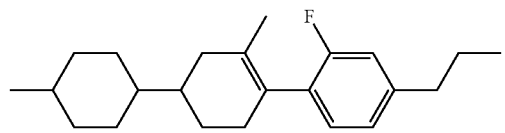

1) Comparative Example 1

TABLE 1

| Code | Comparative example 1 |
|---|---|
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |
| 3-HH-4 | 7.5 |
| 5-HHB(2F,3F)-O2 | 8 |
| 1-Hch(3C)B(2F)-3 | 0 |
| Δn | 0.1 |
| Δε | −3.3 |
| γ1 (mPa · s) | 108 |

2) Example 1

TABLE 2

| Code | Example 1 |
|---|---|
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |

TABLE 2-continued

| Code | Example 1 |
|---|---|
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 1-Hch(3C)B(2F)-3 | 1 |
| Δn | 0.1 |
| Δε | −3.3 |
| γ1 (mPa · s) | 108 |

3) Example 2

TABLE 3

| Code | Example 2 |
|---|---|
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |
| 3-HH-4 | 7.125 |
| 5-HHB(2F,3F)-O2 | 7.6 |
| 1-Hch(3C)B(2F)-3 | 5 |
| Δn | 0.102 |
| Δε | −3.2 |
| γ1 (mPa · s) | 110 |

4) Example 3

TABLE 4

| Code | Example 3 |
|---|---|
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |
| 3-HH-4 | 6.75 |
| 5-HHB(2F,3F)-O2 | 7.2 |
| 1-Hch(3C)B(2F)-3 | 10 |
| Δn | 0.104 |
| Δε | −3.1 |
| γ1 (mPa · s) | 113 |

(2) Second Liquid Crystal Composition

Refractive index anisotropy (Δn), dielectric anisotropy (Δε), and rotary viscosity (γ1) of liquid crystal compositions according to respective contents (0 wt %, 1 wt %, 5 wt %, and 10 wt %) of liquid crystal compounds represented by Chemical Formula 7 below are shown in Tables 5 to 8. The contents of the comparative example and the Examples below were indicated by wt %.

[Chemical Formula 7]

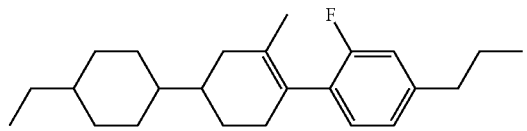

1) Comparative Example 2

TABLE 5

| Code | Comparative example 2 |
|---|---|
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |
| 3-HH-4 | 7.5 |
| 5-HHB(2F,3F)-O2 | 8 |
| 2-Hch(3C)B(2F)-3 | 0 |
| Δn | 0.1 |
| Δε | −3.3 |
| γ1 (mPa · s) | 108 |

2) Example 4

TABLE 6

| Code | Example 4 |
|---|---|
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 2-Hch(3C)B(2F)-3 | 1 |
| Δn | 0.1 |
| Δε | −3.3 |
| γ1 (mPa · s) | 108 |

3) Example 5

TABLE 7

| Code | Example 5 |
|---|---|
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |
| 3-HH-4 | 7.125 |
| 5-HHB(2F,3F)-O2 | 7.6 |

TABLE 7-continued

| Code | Example 5 |
|---|---|
| 2-Hch(3C)B(2F)-3 | 5 |
| Δn | 0.102 |
| Δε | −3.2 |
| γ1 (mPa · s) | 111 |

4) Example 6

TABLE 8

| Code | Example 6 |
|---|---|
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |
| 3-HH-4 | 6.75 |
| 5-HHB(2F,3F)-O2 | 7.2 |
| 2-Hch(3C)B(2F)-3 | 10 |
| Δn | 0.104 |
| Δε | −3.1 |
| γ1 (mPa · s) | 114 |

(3) Third Liquid Crystal Composition

Refractive index anisotropy (Δn), Dielectric anisotropy (Δε), and rotary viscosity (γ1) of liquid crystal compositions according to respective contents (0 wt %, 1 wt %, 5 wt %, and 10 wt %) of liquid crystal compounds represented by Chemical Formula 8 below are shown in Tables 9 to 12. The contents of the comparative example and the Examples below were represented by wt %.

[Chemical Formula 8]

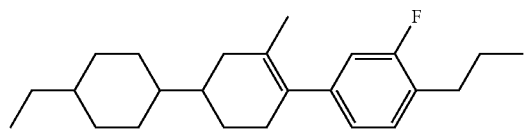

1) Comparative Example 3

TABLE 9

| Code | Comparative example 3 |
|---|---|
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |
| 3-HH-4 | 7.5 |
| 5-HHB(2F,3F)-O2 | 8 |
| 2-Hch(3C)B(3F)-3 | 0 |
| Δn | 0.1 |
| Δε | −3.3 |
| γ1 (mPa · s) | 108 |

2) Example 7

TABLE 10

| Code | Example 7 |
|---|---|
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 2-Hch(3C)B(3F)-3 | 1 |
| Δn | 0.1 |
| Δε | −3.3 |
| γ1 (mPa · s) | 108 |

3) Example 8

TABLE 11

| Code | Example 8 |
|---|---|
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |
| 3-HH-4 | 7.125 |
| 5-HHB(2F,3F)-O2 | 7.6 |
| 2-Hch(3C)B(3F)-3 | 5 |
| Δn | 0.102 |
| Δε | −3.2 |
| γ1 (mPa · s) | 111 |

4) Example 9

TABLE 12

| Code | Example 9 |
|---|---|
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |
| 3-HH-4 | 6.75 |
| 5-HHB(2F,3F)-O2 | 7.2 |
| 2-Hch(3C)B(3F)-3 | 10 |
| Δn | 0.104 |

TABLE 12-continued

| Code | Example 9 |
|---|---|
| Δε | −3.1 |
| γ1 (mPa · s) | 114 |

(4) Fourth Liquid Crystal Composition

Refractive index anisotropy (Δn), Dielectric anisotropy (Δε), and rotary viscosity (γ1) of liquid crystal compositions according to respective contents (0 wt %, 1 wt %, 5 wt %, and 10 wt %) of liquid crystal compounds represented by Chemical Formula 9 below are shown in Tables 13 to 16. The contents of the comparative example and the Examples below were indicated by wt %.

[Chemical Formula 9]

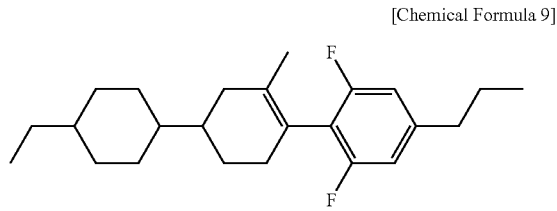 [SMILES: CCCc1cc(F)c(C2=C(C)CC(C3CCC(CC)CC3)CC2)c(F)c1]

1) Comparative Example 4

TABLE 13

| Code | Comparative example 4 |
|---|---|
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |
| 3-HH-4 | 7.5 |
| 5-HHB(2F,3F)-O2 | 8 |
| 2-Hch(3C)B(2F,6F)-3 | 0 |
| Δn | 0.1 |
| Δε | −3.3 |
| γ1 (mPa · s) | 108 |

2) Example 10

TABLE 14

| Code | Example 10 |
|---|---|
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 2-Hch(3C)B(2F,6F)-3 | 1 |
| Δn | 0.1 |

TABLE 14-continued

| Code | Example 10 |
|---|---|
| Δε | −3.3 |
| γ1 (mPa · s) | 108 |

3) Example 11

TABLE 15

| Code | Example 11 |
|---|---|
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |
| 3-HH-4 | 7.125 |
| 5-HHB(2F,3F)-O2 | 7.6 |
| 2-Hch(3C)B(2F,6F)-3 | 5 |
| Δn | 0.101 |
| Δε | −3.2 |
| γ1 (mPa · s) | 111 |

4) Example 12

TABLE 16

| Code | Example 12 |
|---|---|
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |
| 3-HH-4 | 6.75 |
| 5-HHB(2F,3F)-O2 | 7.2 |
| 2-Hch(3C)B(2F,6F)-3 | 10 |
| Δn | 0.103 |
| Δε | −3 |
| γ1 (mPa · s) | 115 |

(5) Fifth Liquid Crystal Composition

Refractive index anisotropy (Δn), Dielectric anisotropy (Δε), and rotary viscosity (γ1) of liquid crystal compositions according to respective contents (0 wt %, 1 wt %, 5 wt %, and 10 wt %) of liquid crystal compounds represented by Chemical Formula 10 below are shown in Tables 17 to 20. The contents of the comparative example and the Examples below were indicated by wt %.

[Chemical Formula 10]

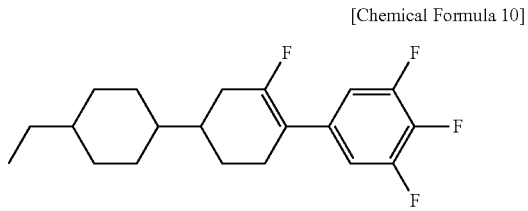 [SMILES: CCC1CCC(C2CCC(c3cc(F)c(F)c(F)c3)=C(C)C2)CC1]

1) Comparative Example 5

TABLE 17

| Code | Comparative example 5 |
| --- | --- |
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |
| 3-HH-4 | 7.5 |
| 5-HHB(2F,3F)-O2 | 8 |
| 2-Hch(3F)B(F,F)-F | 0 |
| $\Delta n$ | 0.1 |
| $\Delta \varepsilon$ | -3.3 |
| $\gamma 1$ (mPa · s) | 108 |

2) Example 13

TABLE 18

| Code | Example 13 |
| --- | --- |
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 2-Hch(3F)B(F,F)-F | 1 |
| $\Delta n$ | 0.1 |
| $\Delta \varepsilon$ | -3.1 |
| $\gamma 1$ (mPa · s) | 108 |

3) Example 14

TABLE 19

| Code | Example 14 |
| --- | --- |
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |

TABLE 19-continued

| Code | Example 14 |
| --- | --- |
| 3-HH-4 | 7.125 |
| 5-HHB(2F,3F)-O2 | 7.6 |
| 2-Hch(3F)B(F,F)-F | 5 |
| $\Delta n$ | 0.1 |
| $\Delta \varepsilon$ | -2.4 |
| $\gamma 1$ (mPa · s) | 109 |

4) Example 15

TABLE 20

| Code | Example 15 |
| --- | --- |
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |
| 3-HH-4 | 6.75 |
| 5-HHB(2F,3F)-O2 | 7.2 |
| 2-Hch(3F)B(F,F)-F | 10 |
| $\Delta n$ | 0.099 |
| $\Delta \varepsilon$ | -1.4 |
| $\gamma 1$ (mPa · s) | 110 |

(6) Sixth Liquid Crystal Composition

Refractive index anisotropy ($\Delta n$), Dielectric anisotropy ($\Delta \varepsilon$), and rotary viscosity ($\gamma 1$) of liquid crystal compositions according to respective contents (0 wt %, 1 wt %, 5 wt %, and 10 wt %) of liquid crystal compounds represented by Chemical Formula 11 below are shown in Tables 21 to 24. The contents of the comparative example and the Examples below were represented by wt %.

[Chemical Formula 11]

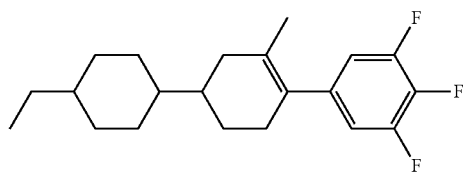

1) Comparative Example 6

TABLE 21

| Code | Comparative example 6 |
| --- | --- |
| 2-HBB(2F,3F)-O2 | 3 |
| 3-BB(2F,3F)-O2 | 16 |
| 3-BB(2F,3F)B-2 | 8 |
| 3-HB(2F,3F)-O2 | 7 |
| 3-HBB(2F,3F)-O2 | 8.5 |
| 2-HH-3 | 8 |
| 3-HH-V | 15 |
| 3-HH-V1 | 9 |
| 3-HHB(2F,3F)-O2 | 10 |

TABLE 21-continued

| Code | Comparative example 6 |
| --- | --- |
| 3-HH-4 | 7.5 |
| 5-HHB(2F,3F)-O2 | 8 |
| 2-Hch(3C)B(F,F)-F | 0 |
| Δn | 0.100 |
| Δε | −3.3 |
| γ1 (mPa · s) | 108 |

2) Example 16

TABLE 22

| Code | Example 16 |
| --- | --- |
| 2-HBB(2F,3F)-O2 | 2.97 |
| 3-BB(2F,3F)-O2 | 15.84 |
| 3-BB(2F,3F)B-2 | 7.92 |
| 3-HB(2F,3F)-O2 | 6.93 |
| 3-HBB(2F,3F)-O2 | 8.415 |
| 2-HH-3 | 7.92 |
| 3-HH-V | 14.85 |
| 3-HH-V1 | 8.91 |
| 3-HHB(2F,3F)-O2 | 9.9 |
| 3-HH-4 | 7.425 |
| 5-HHB(2F,3F)-O2 | 7.92 |
| 2-Hch(3C)B(F,F)-F | 1 |
| Δn | 0.100 |
| Δε | −3.2 |
| γ1 (mPa · s) | 108 |

3) Example 17

TABLE 23

| Code | Example 17 |
| --- | --- |
| 2-HBB(2F,3F)-O2 | 2.85 |
| 3-BB(2F,3F)-O2 | 15.2 |
| 3-BB(2F,3F)B-2 | 7.6 |
| 3-HB(2F,3F)-O2 | 6.65 |
| 3-HBB(2F,3F)-O2 | 8.075 |
| 2-HH-3 | 7.6 |
| 3-HH-V | 14.25 |
| 3-HH-V1 | 8.55 |
| 3-HHB(2F,3F)-O2 | 9.5 |
| 3-HH-4 | 7.125 |
| 5-HHB(2F,3F)-O2 | 7.6 |
| 2-Hch(3C)B(F,F)-F | 5 |
| Δn | 0.101 |
| Δε | −2.7 |
| γ1 (mPa · s) | 109 |

4) Example 18

TABLE 24

| Code | Example 18 |
| --- | --- |
| 2-HBB(2F,3F)-O2 | 2.7 |
| 3-BB(2F,3F)-O2 | 14.4 |
| 3-BB(2F,3F)B-2 | 7.2 |
| 3-HB(2F,3F)-O2 | 6.3 |
| 3-HBB(2F,3F)-O2 | 7.65 |
| 2-HH-3 | 7.2 |
| 3-HH-V | 13.5 |
| 3-HH-V1 | 8.1 |
| 3-HHB(2F,3F)-O2 | 9 |

TABLE 24-continued

| Code | Example 18 |
| --- | --- |
| 3-HH-4 | 6.75 |
| 5-HHB(2F,3F)-O2 | 7.2 |
| 2-Hch(3C)B(F,F)-F | 10 |
| Δn | 0.102 |
| Δε | −2 |
| γ1 (mPa · s) | 111 |

(7) Conclusion

As shown in the comparative example and the Examples, each of the liquid crystal compositions including the liquid crystal compounds represented by Chemical Formula 6 to Chemical Formula 11 had substantially equivalent rotary viscosity to a liquid crystal composition not including the liquid crystal compounds represented by Chemical Formulae 6 to 11.

2. Rotary Viscosity Evaluation 2

Refractive index anisotropy (Δn), dielectric anisotropy (Δε), and rotary viscosity (γ1) of liquid crystal compositions having various compositions depending on contents of liquid crystal compounds represented by Chemical Formula 12 below are shown in Tables 25 to 44. Tables 25 to 29 show a seventh liquid crystal composition being formulated to form different liquid crystal compositions containing 0 wt %, 1 wt %, 5 wt %, 10 wt %, and 15 wt % of a liquid crystal compound represented by Chemical Formula 12 below without a liquid crystal compound having a terminal alkenyl group. Tables 30 to 34 show an eighth liquid crystal composition and Tables 35 to 39 show a ninth liquid crystal composition being formulated to form different low rotary viscosity liquid crystal compositions containing 0 wt %, 1 wt %, 5 wt %, 10 wt %, and 15 wt % of the liquid crystal compound represented by Chemical Formula 12 below. Tables 40 to 44 show a tenth liquid crystal composition being formulated to form a liquid crystal composition comprising a polar liquid crystal compound having a terminal alkenyl group, and also containing a liquid crystal compound represented by Chemical Formula 12 below. The contents of the comparative example and the Examples below were indicated by wt %.

[Chemical Formula 12]

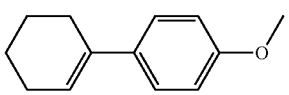

(1) Seventh Liquid Crystal Composition

1) Comparative Example 7

TABLE 25

| Code | Comparative example 7 |
| --- | --- |
| 2-BB-2 | 12.7 |
| 2-H1OB(2F,3F)-O2 | 12.5 |
| 2-HH-3 | 18 |

TABLE 25-continued

| Code | Comparative example 7 |
|---|---|
| 3-HBB(2F,3F)-O2 | 22 |
| 3-HBB-2 | 10.5 |
| 3-HH-4 | 7.5 |
| 3-HH1OB(2F,3F)-O2 | 16.8 |
| 0-chB-O1 | 0 |
| Δn | 0.112 |
| Δε | −3.6 |
| γ1 (mPa · s) | 113 |

2) Example 19

TABLE 26

| Code | Example 19 |
|---|---|
| 2-BB-2 | 12.6 |
| 2-H1OB(2F,3F)-O2 | 12.4 |
| 2-HH-3 | 17.8 |
| 3-HBB(2F,3F)-O2 | 21.8 |
| 3-HBB-2 | 10.4 |
| 3-HH-4 | 7.4 |
| 3-HH1OB(2F,3F)-O2 | 16.6 |
| 0-chB-O1 | 1 |
| Δn | 0.112 |
| Δε | −3.6 |
| γ1 (mPa · s) | 111 |

3) Example 20

TABLE 27

| Code | Example 20 |
|---|---|
| 2-BB-2 | 12.1 |
| 2-H1OB(2F,3F)-O2 | 11.9 |
| 2-HH-3 | 17.0 |
| 3-HBB(2F,3F)-O2 | 20.9 |
| 3-HBB-2 | 10.0 |
| 3-HH-4 | 7.1 |
| 3-HH1OB(2F,3F)-O2 | 16.0 |
| 0-chB-O1 | 5 |
| Δn | 0.111 |
| Δε | −3.4 |
| γ1 (mPa · s) | 106 |

4) Example 21

TABLE 28

| Code | Example 21 |
|---|---|
| 2-BB-2 | 11.4 |
| 2-H1OB(2F,3F)-O2 | 11.3 |
| 2-HH-3 | 16.1 |
| 3-HBB(2F,3F)-O2 | 19.8 |
| 3-HBB-2 | 9.5 |
| 3-HH-4 | 6.8 |
| 3-HH1OB(2F,3F)-O2 | 15.1 |
| 0-chB-O1 | 10 |
| Δn | 0.11 |
| Δε | −3.2 |
| γ1 (mPa · s) | 100 |

5) Example 22

TABLE 29

| Code | Example 22 |
|---|---|
| 2-BB-2 | 10.8 |
| 2-H1OB(2F,3F)-O2 | 10.6 |
| 2-HH-3 | 15.3 |
| 3-HBB(2F,3F)-O2 | 18.7 |
| 3-HBB-2 | 9.0 |
| 3-HH-4 | 6.3 |
| 3-HH1OB(2F,3F)-O2 | 14.3 |
| 0-chB-O1 | 15 |
| Δn | 0.109 |
| Δε | −3.1 |
| γ1 (mPa · s) | 95.0 |

(2) Eighth Liquid Crystal Composition

1) Comparative Example 8

TABLE 30

| Code | Comparative example 8 |
|---|---|
| 2-BB-2 | 12.7 |
| 2-H1OB(2F,3F)-O2 | 12.5 |
| 2-HH-3 | 15.5 |
| 3-HBB(2F,3F)-O2 | 22 |
| 3-HBB-2 | 10.5 |
| V-HH-3 | 10 |
| 3-HH1OB(2F,3F)-O2 | 16.8 |
| 0-chB-O1 | 0 |
| Δn | 0.111 |
| Δε | −3.6 |
| γ1 (mPa · s) | 113 |

2) Example 23

TABLE 31

| Code | Example 23 |
|---|---|
| 2-BB-2 | 12.6 |
| 2-H1OB(2F,3F)-O2 | 12.4 |
| 2-HH-3 | 15.3 |
| 3-HBB(2F,3F)-O2 | 21.8 |
| 3-HBB-2 | 10.4 |
| V-HH-3 | 9.9 |
| 3-HH1OB(2F,3F)-O2 | 16.6 |
| 0-chB-O1 | 1 |
| Δn | 0.111 |
| Δε | −3.5 |
| γ1 (mPa · s) | 112 |

3) Example 24

TABLE 32

| Code | Example 24 |
|---|---|
| 2-BB-2 | 12.1 |
| 2-H1OB(2F,3F)-O2 | 11.9 |
| 2-HH-3 | 14.6 |
| 3-HBB(2F,3F)-O2 | 20.9 |
| 3-HBB-2 | 10.0 |
| V-HH-3 | 9.5 |

TABLE 32-continued

| Code | Example 24 |
| --- | --- |
| 3-HH1OB(2F,3F)-O2 | 16.0 |
| 0-chB-O1 | 5 |
| Δn | 0.11 |
| Δε | −3.4 |
| γ1 (mPa·s) | 106 |

4) Example 25

TABLE 33

| Code | Example 25 |
| --- | --- |
| 2-BB-2 | 11.4 |
| 2-H1OB(2F,3F)-O2 | 11.3 |
| 2-HH-3 | 13.9 |
| 3-HBB(2F,3F)-O2 | 19.8 |
| 3-HBB-2 | 9.5 |
| V-HH-3 | 9.0 |
| 3-HH1OB(2F,3F)-O2 | 15.1 |
| 0-chB-O1 | 10 |
| Δn | 0.109 |
| Δε | −3.2 |
| γ1 (mPa·s) | 100 |

5) Example 26

TABLE 34

| Code | Example 26 |
| --- | --- |
| 2-BB-2 | 10.8 |
| 2-H1OB(2F,3F)-O2 | 10.6 |
| 2-HH-3 | 13.2 |
| 3-HBB(2F,3F)-O2 | 18.7 |
| 3-HBB-2 | 8.9 |
| V-HH-3 | 8.5 |
| 3-HH1OB(2F,3F)-O2 | 14.3 |
| 0-chB-O1 | 15 |
| Δn | 0.108 |
| Δε | −3.0 |
| γ1 (mPa·s) | 95.0 |

(3) Ninth Liquid Crystal Composition

1) Comparative Example 9

TABLE 35

| Code | Comparative example 9 |
| --- | --- |
| 2-BB-2 | 12.7 |
| 2-H1OB(2F,3F)-O2 | 12.5 |
| 2-HH-3 | 16.5 |
| 3-HBB(2F,3F)-O2 | 22 |
| 3-HBB-2 | 10.5 |
| 3-HH-4 | 5 |
| 3-HH1OB(2F,3F)-O2 | 15.8 |
| 3-HH-V1 | 5 |
| 0-chB-O1 | 0 |
| Δn | 0.113 |
| Δε | −3.5 |
| γ1 (mPa·s) | 112 |

2) Example 27

TABLE 36

| Code | Example 27 |
| --- | --- |
| 2-BB-2 | 12.6 |
| 2-H1OB(2F,3F)-O2 | 12.4 |
| 2-HH-3 | 16.2 |
| 3-HBB(2F,3F)-O2 | 21.8 |
| 3-HBB-2 | 10.4 |
| 3-HH-4 | 5.0 |
| 3-HH1OB(2F,3F)-O2 | 15.6 |
| 3-HH-V1 | 5.0 |
| 0-chB-O1 | 1.0 |
| Δn | 0.112 |
| Δε | −3.5 |
| γ1 (mPa·s) | 110 |

3) Example 28

TABLE 37

| Code | Example 28 |
| --- | --- |
| 2-BB-2 | 12.1 |
| 2-H1OB(2F,3F)-O2 | 11.9 |
| 2-HH-3 | 15.5 |
| 3-HBB(2F,3F)-O2 | 20.9 |
| 3-HBB-2 | 10.0 |
| 3-HH-4 | 4.8 |
| 3-HH1OB(2F,3F)-O2 | 15.0 |
| 3-HH-V1 | 4.8 |
| 0-chB-O1 | 5.0 |
| Δn | 0.112 |
| Δε | −3.3 |
| γ1 (mPa·s) | 105 |

4) Example 29

TABLE 38

| Code | Example 29 |
| --- | --- |
| 2-BB-2 | 11.4 |
| 2-H1OB(2F,3F)-O2 | 11.3 |
| 2-HH-3 | 14.8 |
| 3-HBB(2F,3F)-O2 | 19.8 |
| 3-HBB-2 | 9.5 |
| 3-HH-4 | 4.5 |
| 3-HH1OB(2F,3F)-O2 | 14.2 |
| 3-HH-V1 | 4.5 |
| 0-chB-O1 | 10.0 |
| Δn | 0.11 |
| Δε | −3.2 |
| γ1 (mPa·s) | 99 |

5) Example 30

TABLE 39

| Code | Example 30 |
| --- | --- |
| 2-BB-2 | 10.8 |
| 2-H1OB(2F,3F)-O2 | 10.6 |
| 2-HH-3 | 14.0 |
| 3-HBB(2F,3F)-O2 | 18.7 |

TABLE 39-continued

| Code | Example 30 |
| --- | --- |
| 3-HBB-2 | 8.9 |
| 3-HH-4 | 4.3 |
| 3-HH1OB(2F,3F)-O2 | 13.4 |
| 3-HH-V1 | 4.3 |
| 0-chB-O1 | 15.0 |
| Δn | 0.109 |
| Δε | −3.0 |
| γ1 (mPa · s) | 94.0 |

(4) Tenth Liquid Crystal Composition

1) Comparative Example 10

TABLE 40

| Code | Comparative example 10 |
| --- | --- |
| 2-BB-2 | 13.5 |
| 2-H1OB(2F,3F)-O2 | 4 |
| 2-HH-3 | 29.5 |
| 3-HBB(2F,3F)-O2 | 22 |
| 3-HBB-2 | 7 |
| 1V-H1OB(2F,3F)-O2 | 10 |
| 1V-HH1OB(2F,3F)-O2 | 14 |
| 0-chB-O1 | 0 |
| Δn | 0.111 |
| Δε | −3.5 |
| γ1 (mPa · s) | 100 |

2) Example 31

TABLE 41

| Code | Example 31 |
| --- | --- |
| 2-BB-2 | 13.4 |
| 2-H1OB(2F,3F)-O2 | 4.0 |
| 2-HH-3 | 29.2 |
| 3-HBB(2F,3F)-O2 | 21.8 |
| 3-HBB-2 | 6.9 |
| 1V-H1OB(2F,3F)-O2 | 9.9 |
| 1V-HH1OB(2F,3F)-O2 | 13.8 |
| 0-chB-O1 | 1.0 |
| Δn | 0.11 |
| Δε | −3.4 |
| γ1 (mPa · s) | 99 |

3) Example 32

TABLE 42

| Code | Example 32 |
| --- | --- |
| 2-BB-2 | 12.8 |
| 2-H1OB(2F,3F)-O2 | 3.8 |
| 2-HH-3 | 28.0 |
| 3-HBB(2F,3F)-O2 | 20.9 |
| 3-HBB-2 | 6.7 |
| 1V-H1OB(2F,3F)-O2 | 9.5 |
| 1V-HH1OB(2F,3F)-O2 | 13.3 |
| 0-chB-O1 | 5.0 |
| Δn | 0.11 |
| Δε | −3.3 |
| γ1 (mPa · s) | 96 |

4) Example 33

TABLE 43

| Code | Example 33 |
| --- | --- |
| 2-BB-2 | 12.2 |
| 2-H1OB(2F,3F)-O2 | 3.6 |
| 2-HH-3 | 26.5 |
| 3-HBB(2F,3F)-O2 | 19.8 |
| 3-HBB-2 | 6.2 |
| 1V-H1OB(2F,3F)-O2 | 9.0 |
| 1V-HH1OB(2F,3F)-O2 | 12.6 |
| 0-chB-O1 | 10.0 |
| Δn | 0.108 |
| Δε | −3.1 |
| γ1 (mPa · s) | 92 |

5) Example 34

TABLE 44

| Code | Example 34 |
| --- | --- |
| 2-BB-2 | 11.5 |
| 2-H1OB(2F,3F)-O2 | 3.4 |
| 2-HH-3 | 25.0 |
| 3-HBB(2F,3F)-O2 | 18.7 |
| 3-HBB-2 | 6.0 |
| 1V-H1OB(2F,3F)-O2 | 8.5 |
| 1V-HH1OB(2F,3F)-O2 | 11.9 |
| 0-chB-O1 | 15.0 |
| Δn | 0.108 |
| Δε | −3 |
| γ1 (mPa · s) | 89 |

(5) Conclusion

As shown above in the comparative examples and the Examples, the rotary viscosity of the liquid crystal compositions containing the liquid crystal compound represented by Chemical Formula 12 may decrease as the content of the liquid crystal compound of Chemical Formula 12 increases. Particularly, as for the seventh liquid crystal composition without the liquid crystal compound having the terminal alkenyl group, the eighth and ninth liquid crystal compositions containing the liquid crystal compound having the terminal alkenyl group and having a low rotary viscosity, and the tenth liquid crystal composition containing the polar liquid crystal compound having the terminal alkenyl group, the rotary viscosity was reduced when the liquid crystal compound represented by Chemical Formula 12 was included in these compositions.

3. Voltage Holding Ratio Evaluation 1

FIGS. 5 to 8 are graphs illustrating voltage holding ratios when the above-described seventh to tenth liquid crystal compositions are comprised in a liquid crystal display, respectively.

Referring to FIGS. 5 to 8, as the contents of the liquid crystal compounds of Chemical Formula 12 increase, the voltage holding ratios of the seventh to tenth liquid crystal compositions may increase. The voltage holding ratio of the eighth liquid crystal composition containing the liquid crystal compound having the terminal alkenyl group increased significantly with the increase of the contents of the liquid crystal compounds of Chemical Formula 12. The voltage holding ratio of the tenth liquid crystal composition containing the polar liquid crystal compound having the terminal alkenyl group also increased significantly with the increase of the contents of the liquid crystal compounds of Chemical Formula 12.

4. Voltage Holding Ratio Evaluation 2

Figure 9:
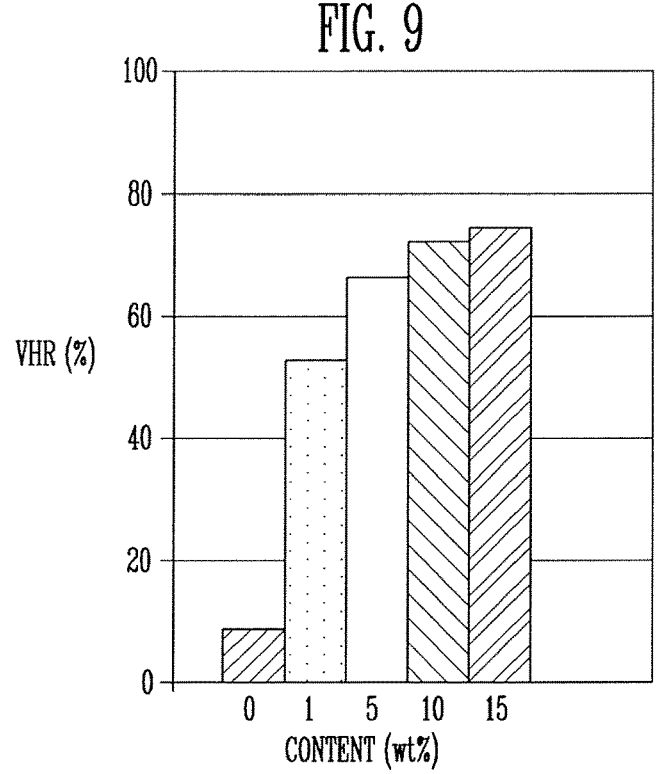
FIGS. 9 and 10 are graphs illustrating voltage holding ratios depending on contents of a liquid crystal compound represented by Chemical Formula 12 when a liquid crystal composition (eighth liquid crystal composition) having negative dielectric anisotropy and a conventional liquid crystal composition having positive dielectric anisotropy are comprised in a liquid crystal display, respectively.
Figure 10:
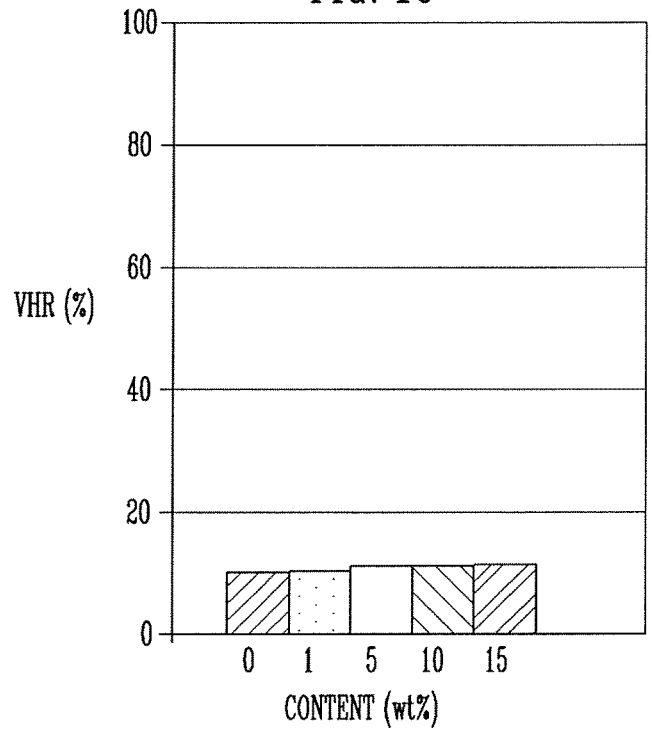

FIGS. 9 and 10 are graphs illustrating voltage holding ratios according to the contents of the liquid crystal compounds of Chemical Formula 12 when a liquid crystal display comprises a liquid crystal composition having negative dielectric anisotropy (eighth liquid crystal composition) and the conventional liquid crystal composition having positive dielectric anisotropy, respectively.

Referring to FIG. 9, the voltage holding ratio of the liquid crystal composition having negative dielectric anisotropy increased significantly with the increase of the contents of the liquid crystal compounds of Chemical Formula 12. On the other hand, referring to FIG. 10, the voltage holding ratios of the liquid crystal composition having positive dielectric anisotropy may remain almost unchanged with the increase of the contents of the liquid crystal compounds of Chemical Formula 12.

According to an exemplary embodiment of the present invention, a liquid crystal composition maintaining low rotary viscosity and having a high voltage holding ratio and a liquid crystal display comprising the liquid crystal composition are provided.

While the present invention has been shown and described with reference to exemplary embodiments thereof, it will be apparent to those of ordinary skill in the art that various changes in form and detail may be made therein without departing from the spirit and scope of the present invention as defined by the following claims.

What is claimed is:

1. A liquid crystal display comprising:

a first substrate;

a second substrate opposing the first substrate;

an electrode portion provided on at least one of the first and second substrates; and a liquid crystal layer provided between the first substrate and the second substrate and including a liquid crystal composition, wherein the liquid crystal composition comprises at least one of liquid crystal compounds represented by the following Chemical Formula 1, at least one of liquid crystal compounds represented b the following Chemical Formula 2 and at least one of liquid crystal compounds represented by the following Chemical Formulae 5-4 to 5-8:

[Chemical Formula 1]

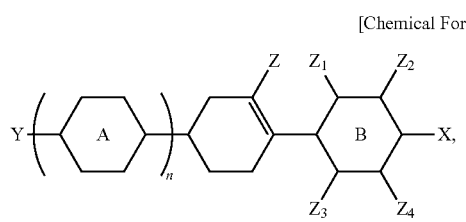

[Chemical Formula 2]

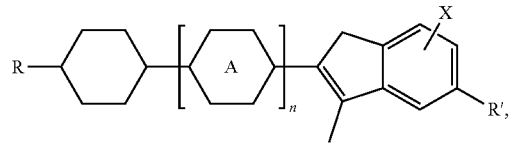

where Y is H or alkyl having 1 to 5 C atoms, the alkyl having 1 to 5 C atoms includes being not substituted or wherein one or more —$CH_2$— groups each, independently of one another, is substituted by —C≡C—, —$CF_2$O—, —O—, —CO—O—, —O—CO— or —O—CO—O so that O atoms are not directly linked to each other, 1 to 3 H atoms are substituted by halogen, or combination thereof, A is 1,4-cyclohexylene or 1,4-phenylene, $Z_1$ to $Z_4$ each, independently of one another, is H, F, Cl, or alkyl having 1 to 2 C atoms, B is 1,4-cyclohexylene or 1,4-phenylene, wherein B is 1,4-phenylene when at least one of $Z_1$ to $Z_4$ is F or Cl, n is 0 or 1, Z is H, F, Cl, or alkyl having 1 to 2 C atoms, wherein Z is H when Y is H, and X is F, Cl, or alkyl having 1 to 4 C atoms, the alkyl having 1 to 4 C atoms includes being not substituted or wherein one or more —$CH_2$— groups each, independently of one another, is substituted by —C≡C—, —$CF_2$O—, —O—, —CO—O—, —O—CO— or —O—CO—O— so that O atoms are not directly linked to each other, 1 to 3 H atoms are substituted by halogen, or combination thereof, and R and R' each, independently of one another, is alkyl or alkoxy having 1 to 4 C atoms,

[Chemical Formula 5-4]

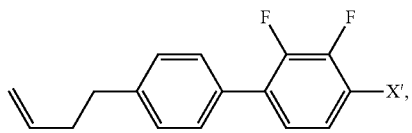

[Chemical Formula 5-5]

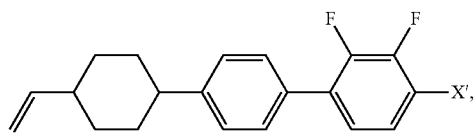

[Chemical Formula 5-6]

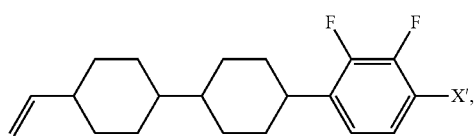

[Chemical Formula 5-7]

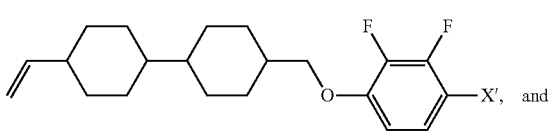

and

-continued

[Chemical Formula 5-8]

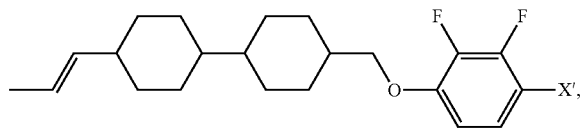

where X' is hydrogen, F, Cl, or alkyl having 1 to 15 C atoms, the alkyl having 1 to 15 C atoms includes being not substituted or wherein one or more —$CH_2$— groups each, independently of one another, is substituted by —C≡C—, —$CF_2$O—, —CH=CH—, —CO—, —O—, —CO—O—, —O—CO— or —O—CO—O— so that O atoms are not directly linked to each other, 1 to 3 H atoms are substituted by halogen, or combination thereof.

2. The liquid crystal display of claim 1, wherein the liquid crystal compound of Chemical Formula 1 is present in an amount exceeding 0 wt % but less than 15 wt % based on a total weight of the liquid crystal composition.

3. The liquid crystal display of claim 1, wherein the liquid crystal compound of Chemical Formula 1 includes at least one of liquid crystal compounds represented by the following Chemical Formula 1-1:

[Chemical Formula 1-1]

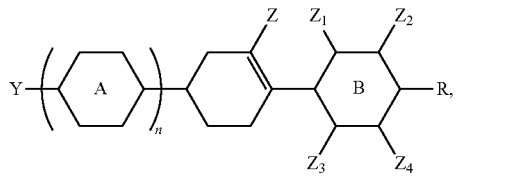

where Y, A, $Z_1$ to $Z_4$, B, n, and Z are as defined in Chemical Formula 1, and R is alkyl or alkoxy having 1 to 4 C atoms.

4. The liquid crystal display of claim 3, wherein the liquid crystal compound of Chemical Formula 1-1 includes at least one of liquid crystal compounds represented by the following Chemical Formulae 1-1-1 to 1-1-5:

[Chemical Formula 1-1-1]

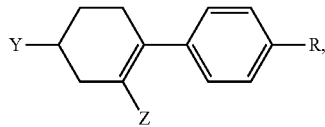

[Chemical Formula 1-1-2]

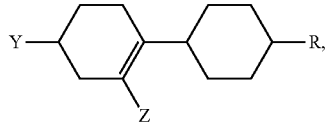

[Chemical Formula 1-1-3]

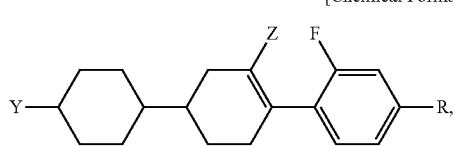

[Chemical Formula 1-1-4]

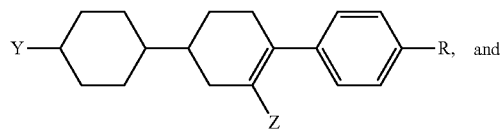

[Chemical Formula 1-1-5]

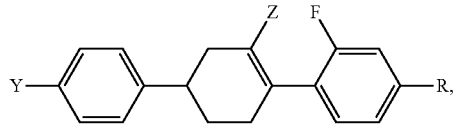

where Y, Z, and R are as defined in Chemical Formula 1-1.

5. The liquid crystal display of claim 1, wherein the liquid crystal compound represented by Chemical Formula 1 includes at least one of liquid crystal compounds represented by the following Chemical Formulae 1-2 and 1-3:

[Chemical Formula 1-2]

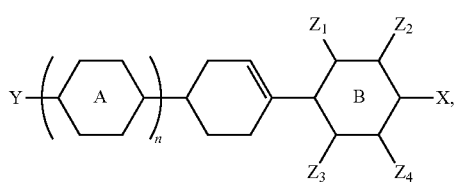

where Y is H, and A, $Z_1$ to $Z_4$, B, n, and X are as defined in Chemical Formula 1, and

[Chemical Formula 1-3]

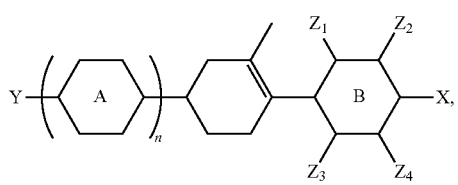

where Y, A, $Z_1$ to $Z_4$, B, n, and X are as defined in Chemical Formula 1.

6. The liquid crystal display of claim 5, wherein the liquid crystal compound of Chemical Formula 1-2 includes at least one of liquid crystal compounds represented by Chemical Formulae 1-2-1 and 1-2-2, and
the liquid crystal compound of Chemical Formula 1-3 includes at least one of liquid crystal compounds represented by the following Chemical Formulae 1-3-1 and 1-3-2:

[Chemical Formula 1-2-1]

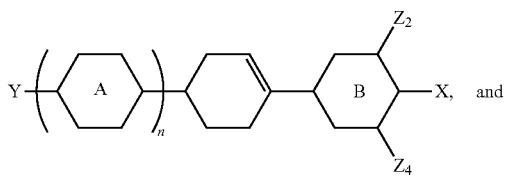

[Chemical Formula 1-2-2]

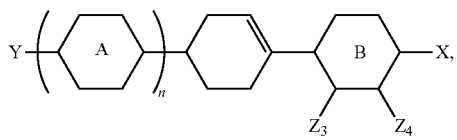

where Y is H, and A, $Z_2$ to $Z_4$, B, n, and X are as defined in Chemical Formula 1,

[Chemical Formula 1-3-1]

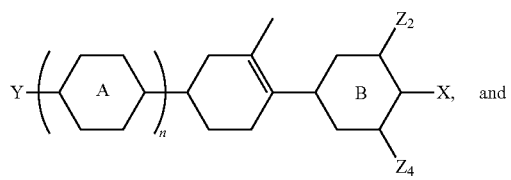

and

[Chemical Formula 1-3-2]

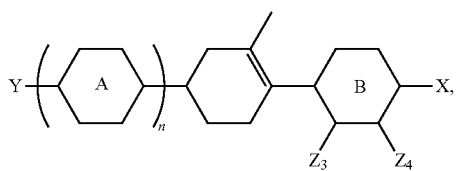

where Y, A, $Z_2$ to $Z_4$, B, n, and X are as defined in Chemical Formula 1.

7. The liquid crystal display of claim 5, wherein the liquid crystal compound of Chemical Formula 1-2 includes at least one of liquid crystal compounds represented by the following Chemical Formulae 1-2-4 and 1-2-5, and the liquid crystal compound of Chemical Formula 1-3 includes at least one of liquid crystal compounds represented by the following Chemical Formulae 1-3-4 and 1-3-5:

[Chemical Formula 1-2-4]

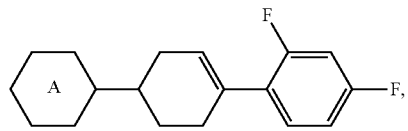

[Chemical Formula 1-2-5]

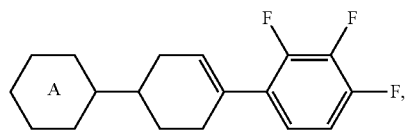

[Chemical Formula 1-3-4]

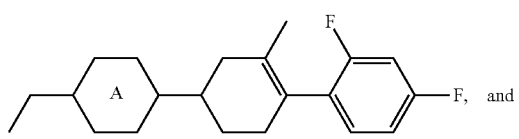

and

[Chemical Formula 1-3-5]

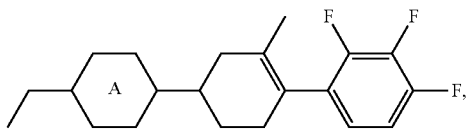

where A is as defined in Chemical Formula 1.

8. The liquid crystal display of claim 5, wherein the liquid crystal compound of Chemical Formula 1-2 includes at least one of liquid crystal compounds represented by the following Chemical Formulae 1-2-6 to 1-2-11, and the liquid crystal compound of Chemical Formula 1-3 includes at least one of liquid crystal compounds represented by Chemical Formulae 1-3-6 to 1-3-12:

[Chemical Formula 1-2-6]

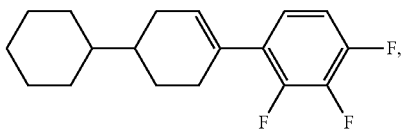

[Chemical Formula 1-2-7]

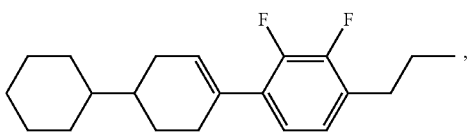

[Chemical Formula 1-2-8]

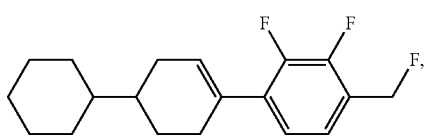

[Chemical Formula 1-2-9]

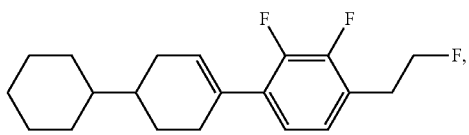

[Chemical Formula 1-2-10]

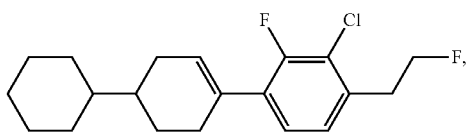

[Chemical Formula 1-2-11]

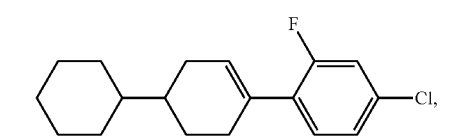

[Chemical Formula 1-3-6]

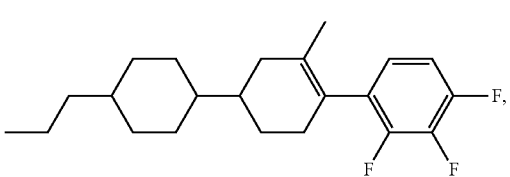

-continued

[Chemical Formula 1-3-7]
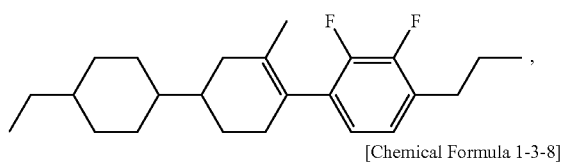

[Chemical Formula 1-3-8]
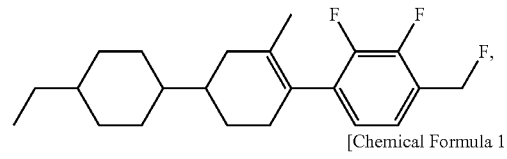

[Chemical Formula 1-3-9]
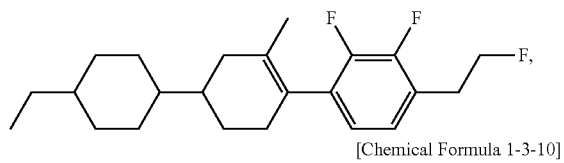

[Chemical Formula 1-3-10]
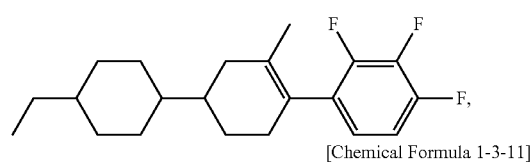

[Chemical Formula 1-3-11]
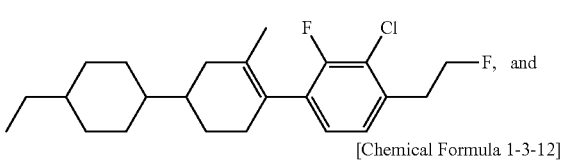, and

[Chemical Formula 1-3-12]
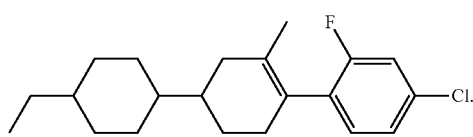

9. The liquid crystal display of claim 1, wherein the liquid crystal composition comprises at least one of liquid crystal compounds represented by the following Chemical Formula 3:

[Chemical Formula 3]
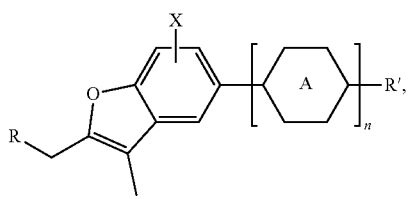

where A, n, R, R' and X of Chemical Formula 3 is as defined in Chemical Formula 1 and Chemical Formula 2.

10. The liquid crystal display of claim 9, wherein any combination of the liquid crystal compound of Chemical Formula 1 and at least one of the liquid crystal compound of Chemical Formula 2 and the liquid crystal compound of Chemical Formula 3, is present in an amount exceeding 0 wt % but less than 15 wt % based on a total weight of the liquid crystal composition.

11. The liquid crystal display of claim 1, further comprising an alignment layer provided between the first substrate and the liquid crystal layer and between the second substrate and the liquid crystal layer,
wherein the alignment layer includes a polymer obtained by polymerizing a monomer represented by the following Chemical Formula 4:

[Chemical Formula 4]
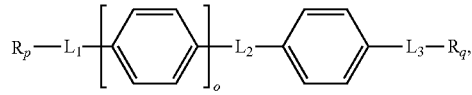

where Rp and Rq each, independently of one another, is acrylate having 1 to 12 C atoms, methacrylate, an epoxy group, an oxetane group, a vinyl-ether group, or a styrene group, $L_1$ to $L_3$ each, independently of one another, is a single bond, an alkyl group having 1 to 10 C atoms, ether, carbonyl, or carboxyl, and o is 1 or 2.

12. The liquid crystal display of claim 11, wherein the polymer obtained by polymerizing the monomer represented by Chemical Formula 4 includes an oxime or acetophenone photoinitiator.

13. The liquid crystal display of claim 1, further comprising a spacer between the first substrate and the second substrate,
wherein the spacer is an organic polymer material including an oxime or acetophenone photoinitiator.

14. The liquid crystal display of claim 1, further comprising a color filter provided on one of the first and second substrates and displaying color,
wherein the color filter is an organic polymer material including an oxime or acetophenone photoinitiator.

15. The liquid crystal display of claim 1, further comprising a black matrix provided on one of the first and second substrates and blocking transmitted light,
wherein the black matrix includes an organic polymer material including an oxime or acetophenone photoinitiator.

16. The liquid crystal display of claim 1, further comprising an encapsulant provided between the first substrate and the second substrate and surrounding the liquid crystal layer,
wherein the encapsulant is an organic polymer material including an oxime or acetophenone photoinitiator.

17. The liquid crystal display of claim 1, wherein the liquid crystal composition has negative dielectric anisotropy.

18. A liquid crystal composition comprised in a liquid crystal display, the liquid crystal composition comprising:
at least one of liquid crystal compounds represented by the following Chemical Formula 1, at least one of liquid crystal compounds represented by the following Chemical Formula 2 and at least one of liquid crystal compounds represented by the following Chemical Formulae 5-4 to 5-8:

[Chemical Formula 1]

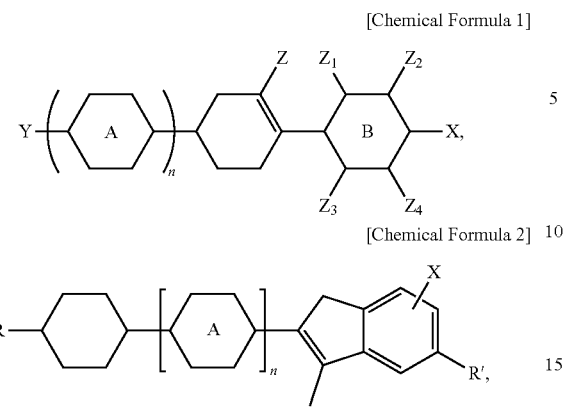

[Chemical Formula 2]

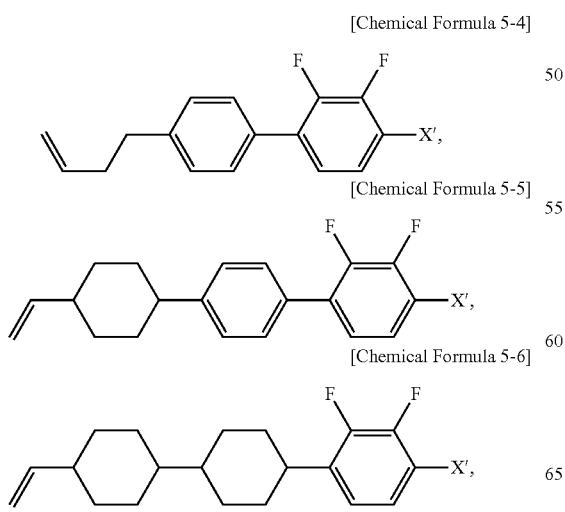

where Y is H or alkyl having 1 to 5 C atoms, the alkyl having 1 to 5 C atoms includes being not substituted or wherein one or more —$CH_2$— groups each, independently of one another, is substituted by —C≡C—, —$CF_2$O—, —O—, —CO—O—, —O—CO— or —O—CO—O— so that O atoms are not directly linked to each other, 1 to 3 H atoms are substituted by halogen, or combination thereof, A is 1,4-cyclohexylene or 1,4-phenylene, $Z_1$ to $Z_4$ each, independently of one another, is H, F, Cl, or alkyl having 1 to 2 C atoms, B is 1,4-cyclohexylene or 1,4-phenylene, wherein B is 1,4-phenylene when at least one of $Z_1$ to $Z_4$ is F or Cl, n is 0 or 1, Z is H, F, Cl, or alkyl having 1 to 2 C atoms, wherein Z is H when Y is H, X is F, Cl, or alkyl having 1 to 4 C atoms, the alkyl having 1 to 4 C atoms includes being not substituted or wherein one or more —$CH_2$— groups each, independently of one another, is substituted by —C≡C—, —$CF_2$O—, —O—, —CO—O—, —O—CO— or —O—CO—O— so that O atoms are not directly linked to each other, 1 to 3 H atoms are substituted by halogen, or combination thereof, and R and R' each, independently of one another, is alkyl or alkoxy having 1 to 4 C atoms,

[Chemical Formula 5-4]

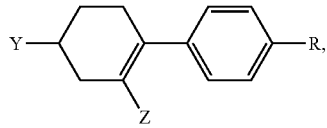

[Chemical Formula 5-5]

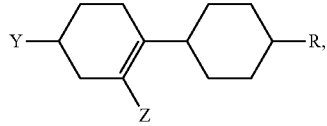

[Chemical Formula 5-6]

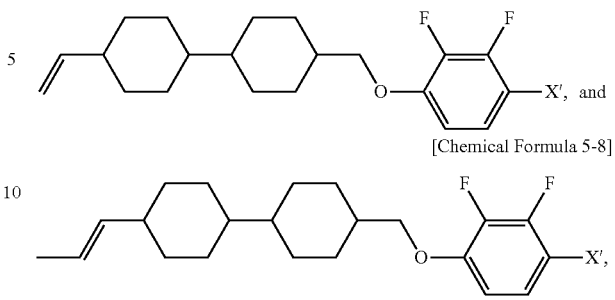

[Chemical Formula 5-7]

[Chemical Formula 5-8]

where X' is hydrogen, F, Cl, or alkyl having 1 to 15 C atoms, the alkyl having 1 to 15 C atoms includes being not substituted or wherein one or more —$CH_2$— groups each, independently of one another, is substituted by —C≡C—, —$CF_2$O—, —CH=CH—, —CO—, —O—, —CO—O—, —O—CO— or —O—CO—O— so that O atoms are not directly linked to each other, 1 to 3 H atoms are substituted by halogen, or combination thereof.

19. The liquid crystal composition of claim 18, wherein the liquid crystal compound of Chemical Formula 1 is present in an amount exceeding 0 wt % but less than 15 wt % based on a total weight of the liquid crystal composition.

20. The liquid crystal composition of claim 18, wherein the liquid crystal compound of Chemical Formula 1 includes at least one of liquid crystal compounds represented by the following Chemical Formulae 1-1-1 to 1-1-5,

[Chemical Formula 1-1-1]

[Chemical Formula 1-1-2]

[Chemical Formula 1-1-3]

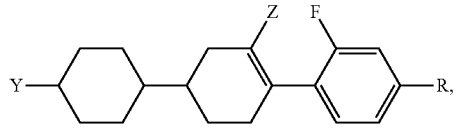

[Chemical Formula 1-1-4]

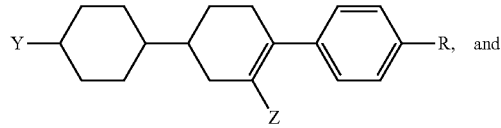

[Chemical Formula 1-1-5]

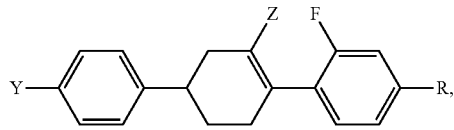

where Y, and Z are as defined in Chemical Formula 1, and R is alkyl or alkoxy having 1 to 4 C atoms.

21. The liquid crystal composition of claim 18, wherein the liquid crystal compound of Chemical Formula 1 includes at least one of liquid crystal compounds represented by the following Chemical Formulae 1-2-1 and 1-2-2 and the following Chemical Formulae 1-3-1 and 1-3-2:

[Chemical Formula 1-2-1]

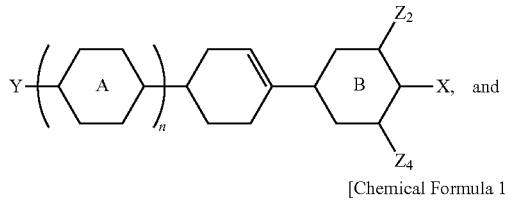

[Chemical Formula 1-2-2]

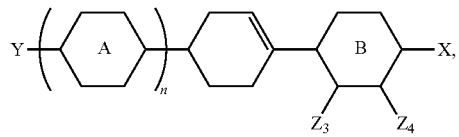

where Y is H, and A, $Z_2$ to $Z_4$, B, n, and X are as defined in Chemical Formula 1,

[Chemical Formula 1-3-1]

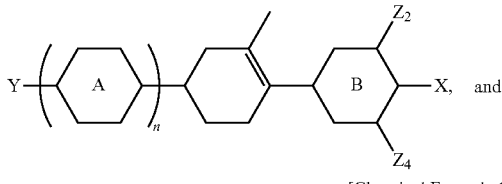

[Chemical Formula 1-3-2]

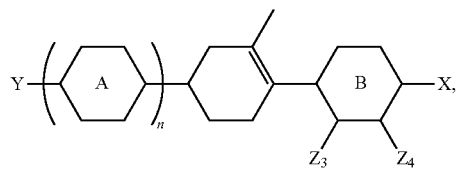

where Y, A, $Z_2$ to $Z_4$, B, n, and X are as defined in Chemical Formula 1.

22. The liquid crystal composition of claim 18, further comprising at least one of liquid crystal compounds represented by the following Chemical Formula 3:

[Chemical Formula 3]

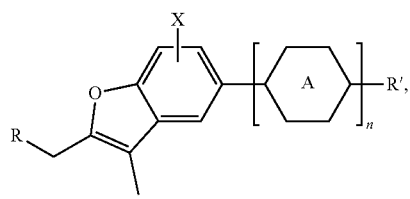

where A, n, R, R' and X of Chemical Formula 3 is as defined in Chemical Formula 1 and Chemical Formula 2.

23. The liquid crystal composition of claim 22, wherein any combination of the liquid crystal compound of Chemical Formula 1 and at least one of the liquid crystal compound of Chemical Formula 2 and the liquid crystal compound of Chemical Formula 3, is present in an amount exceeding 0 wt % but less than 15 wt % based on a total weight of the liquid crystal composition.

24. The liquid crystal composition of claim 18, further comprising a monomer represented by the following Chemical Formula 4:

[Chemical Formula 4]

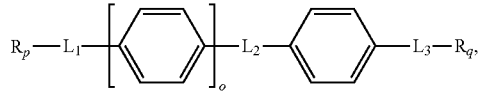

where Rp and Rq each, independently of one another, is an acrylate group having 1 to 12 C atoms, a methacrylate group, an epoxy group, an oxetane group, a vinylether group, or a styrene group,
$L_1$ to $L_3$ each, independently of one another, is a single bond, an alkyl group having 1 to 10 C atoms, ether, carbonyl, or carboxyl, and
o is 1 or 2.

25. The liquid crystal composition of claim 24, further comprising an oxime or acetophenone photoinitiator.

26. A liquid crystal composition comprising:
at least one of liquid crystal compounds represented by the following Chemical Formula 1, at least one of liquid crystal compounds represented by the following Chemical Formula 2 and at least one of liquid crystal compounds represented by the following Chemical Formulae 5-4 to 5-8:

[Chemical Formula 1]

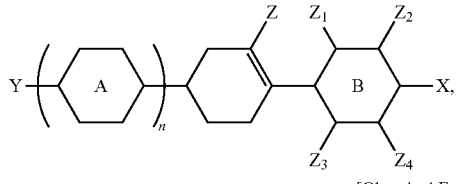

[Chemical Formula 2]

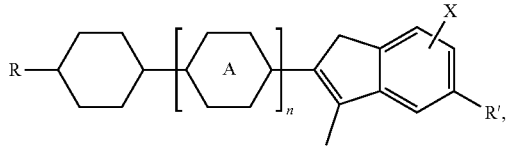

where Y is H or a hydrocarbon group having 1 to 10 C atoms, the hydrocarbon group having 1 to 10 C atoms optionally includes one or more hetero atoms,
A is 1,4-cyclohexylene or 1,4-phenylene,
$Z_1$ to $Z_4$ each, independently of one another, is H, F, Cl, or alkyl having 1 to 2 C atoms,
B is 1,4-cyclohexylene or 1,4-phenylene, wherein B is 1,4-phenylene when at least one of $Z_1$ to $Z_4$ is F or Cl,
n is 0 or 1,
Z is H, F, Cl, or alkyl having 1 to 2 C atoms, wherein Z is H when Y is H,
X is F, Cl, or a hydrocarbon group having 1 to 8 C atoms, the hydrocarbon group having 1 to 8 C atoms optionally includes one or more hetero atoms, and R and R' each, independently of one another, is alkyl or alkoxy having 1 to 4 C atoms

[Chemical Formula 5-4]

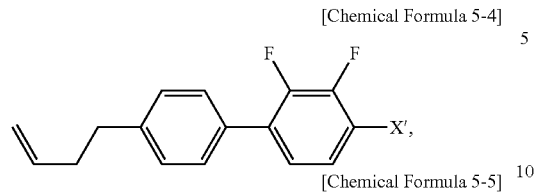

[Chemical Formula 5-5]

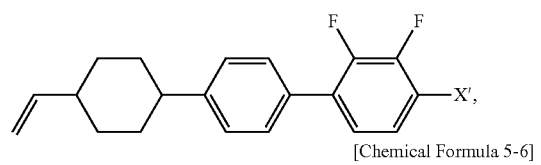

[Chemical Formula 5-6]

[Chemical Formula 5-7]

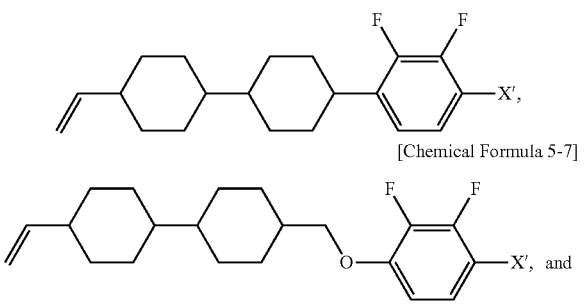

[Chemical Formula 5-8]

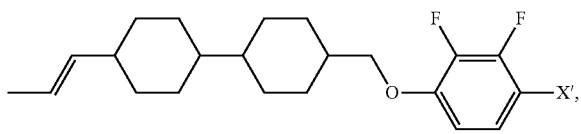

where X' is hydrogen, F, Cl, or alkyl having 1 to 15 C atoms, the alkyl having 1 to 15 C atoms includes being not substituted or wherein one or more —$CH_2$— groups each, independently of one another, is substituted by —C≡C—, —$CF_2$O—, —CH=CH—, —CO—, —O—, —CO—O—, —O—CO— or —O—CO—O— so that O atoms are not directly linked to each other, 1 to 3 H atoms are substituted by halogen, or combination thereof.

27. The liquid crystal composition of claim 26 has negative dielectric anisotropy.

28. The liquid crystal composition of claim 26, wherein the liquid crystal compound of Chemical Formula 1 is present in an amount exceeding 0 wt % but less than 15 wt % based on a total weight of the liquid crystal composition.

* * * * *